(12) United States Patent
Kim et al.

(10) Patent No.: US 6,593,882 B1
(45) Date of Patent: Jul. 15, 2003

(54) METHOD FOR PROCESSING SIGNAL OF ADAPTIVE ARRAY SMART ANTENNA IN ARRAY SMART ANTENNA SYSTEM

(75) Inventors: Je-Woo Kim, Kyunggi-do (KR);
Jong-Hyeon Park, Seoul (KR);
Bok-Tae Shim, Seoul (KR);
Sang-Hoon Roh, Busan-shi (KR);
Tae-Ryun Chang, Busan-shi (KR)

(73) Assignee: TeleCIS Technologies, Inc. (KR)

( * ) Notice: Subject to any disclaimer, the term of this patent is extended or adjusted under 35 U.S.C. 154(b) by 0 days.

(21) Appl. No.: 10/106,608

(22) Filed: Mar. 26, 2002

(51) Int. Cl.$^7$ ................................................ H01Q 3/26
(52) U.S. Cl. ...................................... 342/373; 342/378
(58) Field of Search ............................. 342/373, 372, 342/368, 378, 380, 383, 382

(56) References Cited

U.S. PATENT DOCUMENTS 5,608,409 A * 3/1997 Rilling .......................... 342/380
5,966,095 A * 10/1999 Hiramatsu et al. .......... 342/383
6,369,758 B1 * 4/2002 Zhang ........................... 342/383

* cited by examiner

*Primary Examiner*—Dao Phan
(74) *Attorney, Agent, or Firm*—Grossman, Tucker, Perreault & Pfleger, PLLC

(57) ABSTRACT

There are provided adaptive beamforming algorithms for an adaptive array smart antenna. According to one embodiment of the present invention, the adaptive array smart antenna constructs an input signal matrix with a predetermined number of input signals, computes a transmission signal matrix that minimizes a cost function using a first steering matrix set to an initial value and the input signal matrix, computes a second steering matrix that minimizes the cost function using the transmission signal matrix and the input signal matrix, maps the second steering matrix on a unit circle, constructs a third steering matrix with the mapped values, normalizes the third steering matrix and determining whether the third steering matrix converges, and demodulates data using the transmission signal matrix if the third steering matrix converges.

32 Claims, 14 Drawing Sheets

(a) STATIONARY MOBILE (b) MOVING MOBILE

METHOD FOR PROCESSING SIGNAL OF ADAPTIVE ARRAY SMART ANTENNA IN ARRAY SMART ANTENNA SYSTEM

BACKGROUND OF THE INVENTION

1. Field of the Invention

The present invention relates generally to an antenna device and a control method thereof, and in particular, to a smart antenna device and a control method thereof.

2. Description of the Related Art

In general, an antenna device receives a signal at a predetermined frequency. Antenna devices have been developed for long distance communications and are currently being used for base stations and terminals in mobile communication systems. Along with the rapid development of antennas, the concept of a smart antenna has been introduced. A smart antenna is an intelligent antenna that forms beams after signal processing for a particular purpose in a base station or a mobile terminal. It is expected that smart antennas will be adopted for IMT-2000 (International Mobile Telecommunicaiton-2000). The use of a smart antenna increases system performance.

The smart antenna has emerged as a solution to the problem of limited available frequency resources. Especially with low power, the smart antenna can exert the same performance as or higher performance than the existing systems. The smart antenna is operated on the principle that only a desired signal is extracted from interfering signals, that is, a high gain is given to a desired signal's direction, and a low gain to the directions of the other signals to thereby enable a transmitting/receiving end to obtain more power with respect to the same transmission power. The smart antenna incurs constructive interference in the desired location and destructive interference elsewhere, which is called beamforming.

The smart antenna has three advantages on the whole.

First, signals are gathered to a desired location without distribution, thereby increasing gain. Therefore, a coverage area per base station becomes wider and the increase of gain reduces the power consumption of a mobile terminal, that is, the life of its battery is increased.

Secondly, since signals in undesired directions are effectively removed, interference can be cancelled. In particular, the interference canceling effect becomes great in a system susceptible to interference like CDMA (Code Division Multiple Access). A CDMA system then accommodates more subscribers in the case of voice communication and provides high rate data communication in the case of data communication.

Thirdly, the smart antenna also implements spatial filtering. Accordingly, multipath effects can be remarkably reduced.

There are two types of smart antennas depending on their beamformation methods: switched beam smart antennas and adaptive beam smart antennas. The former uses a fixed beam pattern and so may result in performance decrease if a user is disposed between antenna patterns. On the other hand, the latter uses an antenna pattern that varies with time or according to ambient environment, thus operating more adaptively to the environment than the former and can form a beam direct to a user.

The aim of a switched beam smart antenna is to detect the direction of a strong signal and select the signal from the direction.

Most of adaptive beamforming algorithms may be categorized into the following three classes or combinations of them.

Algorithms based on estimation of DOAs (Directions Of Arrival) of received signals.

In the DOA-estimation-based algorithms, the DOAs of received signals are first estimated and beams are then formed in the estimated directions. The techniques for DOA estimation include MUSIC (Multiple Signal Classification), Pisarenko, ESPRIT (Estimation of Signal Parameters via Rotational Invariance Techniques), and ML (Maximum Likelihood). Beamformers operate by conventional beamforming and LCMV (Linear Constraint Minimum Variance).

Algorithms based on training sequence.

In these algorithms including SMI (Sample Matrix Inversion), LMS (Least Mean Square) and RLS (Recursive Least Square), a beam pattern is determined using a training sequence which is known to both the transmitter and the receiver. The training sequence based algorithms are easy to implement though limited, due to the use of a training sequence.

Blind adaptive algorithms.

Blind adaptive algorithms do not require a training sequence. Instead, they exploit some known properties of a desired received signal in determining a beam pattern. These blind adaptive algorithms include CMA (Constant Modulus Algorithm) and FA (Finite Alphabet) utilizing signal constellation, and a cyclo-stationary method and a high order statistic method based on oversampling characteristics. A disadvantage of these algorithms is complexity though they are free of overhead such as the use of a training sequence and constraints.

Many blind adaptive algorithms have been studied and suggested. Blind adaptive beamformation is done by spectral estimation or parameter estimation.

Major spectrum estimation methods are power maximization and LS-SCORE (Least Square-Spectral Self Coherence Restoral). Most of those methods are based on eigen decomposition. Especially, MCGM (Modified Conjugate Gradient Method) allows real time processing and has relatively good performance.

Major parameter estimation methods are ML (Maximum Likelihood) and ILSP (Iterative Least Square Projection). Despite its excellent performance, ML requires a considerable volume of computation. Meanwhile, ILSP markedly reduces the computation requirements inherent to the ML by iterating the least square solutions of ML, but it is not suitable for real time processing. The volume of required computation can be remarkably reduced by ILSP-CMA that employs ILSP along with CMA utilizing the constant envelope of a signal.

ILSP-CMA iteratively calculates solutions using the constant envelope of a signal. While it stably operates and has good performance, ILSP-CMA is not available to a signal that does not have a constant envelope. ILSP-CMA is the process of generating an M×N input signal matrix for the input of N snapshots and processing the matrix as a block. This method causes latency and requires a great volume of instantaneous computation and large instantaneous memory capacity.

ILSP-CMA will be described below in more detail in connection with the structure of an adaptive array antenna.

FIG. 1 is a block diagram of a typical adaptive array antenna. Referring to FIG. 1, an array antenna 101 includes a set of M antennas, each antenna having the same characteristics. The antennas are uniformly spaced from each other by a distance d. $\theta_k$ is the incident angle of a signal impinging on an antenna from a $k^{th}$ signal source Signals received at the array antenna 101 are fed to a pre-beamforming block 102. The pre-beamforming block 102, which is an optional block, performs coarse beamforming using the result of post-beamforming or preliminarily acquired information. A despreader 103 despreads the coarsely beamformed signals to reduce interference from the other signal sources and thus to facilitate signal processing. The despreader 103 is available only to a CDMA system. The despreader 103 may be disposed as shown in FIG. 1 or at the rear end of an adaptive array processing unit 105. M despread signals, $X_1$ to $X_M$ are applied to the input of the adaptive array processing unit 105.

The adaptive array processing unit 105 includes weight factor operators 108 to 110 for assigning weight factors to the M input signals, an adder 111 for summing the outputs of the weight factor operators 108 to 110, an error generator 107, and an adaptive algorithm processor 106. In operation, the output signal $\hat{S}_k$ of the adaptive array processing unit 105 and a reference signal $S_k$ are fed to the error generator 107. The error generator 107 generates an error signal using the two input signals. The adaptive algorithm processor 106 calculates weight factors $W_1$ to $W_M$ from the error signal by a predetermined algorithm. The weight factor operators 108 to 110 calculate the input signals $X_1$ to $X_M$ with the weight factors $W_1$ to $W_M$. The adder 111 sums the calculated signals received from the weight factor operators 108 to 110.

A detailed description is made below of the operation of the adaptive array processing unit 105.

A signal received from K signal sources in total at an $m^{th}$ antenna among the M antennas of the array antenna 101 is calculated by $$x_m(t) = \sum_{k=1}^{K} S_k(t) e^{-j2\pi \frac{(m-1)d}{\lambda} \sin\theta_k} + v_m(t) \qquad (1)$$

where $S_k(t)$ is a signal from a $k^{th}$ signal source, $\theta_k$ is the incident angle of the signal from the $k^{th}$ signal source, and $v_m(t)$ is Additive White Gaussian Noise (AWGN) added to the $m^{th}$ antenna. If the distance d between the antennas is $\lambda/1$, equation (1) is changed to $$x_m(t) = \sum_{k=1}^{K} S_k(t) e^{-j\pi(m-1)\sin\theta_k} + v_m(t) \qquad (2)$$

Equations (1) and (2) are be expressed in matrices for K signal sources and N snapshots as $$X = AS + V \qquad (3)$$

where X is an M×N matrix of signals received at the array antenna 101, A is an M×K steering matrix, S is a K×N matrix of transmitted signals from the signal sources, and V is an M×N noise matrix. Therefore, $$X = [X(1)X(2) \ldots X(n) \ldots X(N)]$$

$$S = [S_1 S_2 \ldots S_k \ldots S_K]^T$$

$$A_k = [A_1 A_2 \ldots A_k \ldots A_K] \qquad (4)$$

where X(n) is a signal received at an $n^{th}$ antenna, $S_k$ is a transmission signal from a $k^{th}$ signal source, and $A_k$ is a $k^{th}$ steering vector, which can be also expressed as $$X(n) = [x_1(n) x_2(n) \ldots x_m(n) \ldots x_M(n)]^T$$

$$S_k = [S_k(1) S_k(2) \ldots S_k(n) \ldots S_k(N)]$$

$$A_k = [a_k(1) a_k(2) \ldots a_k(m) \ldots a_k(M)]^T$$

$$= [1 e^{-j\pi\sin\theta_k} \ldots e^{-j\pi(m-1)\sin\theta_k} \ldots e^{-j\pi(M-1)\sin\theta_k}]^T \qquad (5)$$

In the case of a CDMA system, signals from undesired signal sources are removed through despreading in the despreader 103 and so the system can be simply modeled to have a particular $k^{th}$ signal source. Accordingly, S and A in equation (5) reduce to $S \approx S_k$, for CDMA system after despreading $A \approx A_k$, for CDMA system after despreading $\qquad (6)$ The adaptive array antenna system obtains the steering matrix A having an optimal solution using equation (4) in the adaptive array processing unit 105 of FIG. 1. For X=AS, only the input signal matrix X in equation (4) is known. MA estimation is usually used to estimate the transmission matrix S and the steering matrix A. The ML estimation is to minimize the cost function F(A, S) of equation (7) to equation (8).

$$F(A, S:X) = \|X - AS\|_F^2 \qquad (7)$$

$$_{A,S}^{min} = \|X - AS\|_F^2 \qquad (8)$$

where $\|\bullet\|_F^2$ is a squared Frobenius form. A major method to iterate the optimal solution of equations (7) and Eq. (8), ILSP-CMA will be described with reference to FIG. 2.

FIG. 2 is a flowchart illustrating an ILSP-CMA method for obtaining an optimal solution to a squared Frobenius form.

The ILSP-CNA calculates solutions iteratively to achieve optimal A and S from the input signal matrix X in equations. (7) and (8) on the assumption that the matrix S has a constant envelope.

Referring to FIGS. 1 and 2, an iteration coefficient i is set to 0 and the steering matrix A is set to its initial value $A^0$ in step 200. The adaptive array antenna system waits until N snapshots are received to generate the input signal matrix X in step 202. Upon receipt of N snapshots, the iteration coefficient i is increased by 1 in step 204 and a transmission signal matrix $S^i$ that minimizes F(A, S:X) is obtained by computing a least square solution using a steering matrix $A^{i-1}$ in step 206 as follows.

$$S^i = ((A^{i-1})^H A^{i-1})^{-1} (A^{i-1})^H X \qquad (9)$$

In equation (9) and hereinbelow, $(\ )^H$ denotes a Hermitian operation.

Since the transmission signals have constant envelopes, the transmission signal matrix $S^i$ is mapped to the nearest points on a unit circle. After the mapping, in step 208 a steering matrix $A^i$ that minimizes F(A, S:X) is obtained by calculating a least square using the transmission signal matrix $S^i$ by $$A^i = X(S^i)^H (S^i(S^i)^H)^{-1} \qquad (10)$$

and the elements of each column in the steering matrix $A^i$ are normalized by dividing them by the first element in each column vector in the steering matrix $A^1$. It is determined whether the steering matrix $A^i$ has converged in step 210. If the steering matrix $A^i$ has converged, the iteration is terminated and the procedure goes to step 212. Otherwise, the procedure returns to step 204. In step 212, data is modulated using the transmission signal matrix S, or a weight factor W is calculated using the steering matrix A and the transmission signal matrix S is computed for data modulation.

The above-described ILSP-CMA method iteratively calculates solutions using the constant envelope of a signal. Therefore, it operates stably in a co-channel interference environment and has good performance.

The ILSP-CMA method, however, is not applicable to a signal that does not have a constant envelope. Moreover, M×N input signals must be generated in an M×N matrix after N snapshots are received and the M×N signals are processed as a unit block. This implies that a memory of at least a block size must be prepared for block processing. When an input block is processed after its reception, much instantaneous volume of computation is required. Also, a memory for accommodating the computation requirement is needed.

SUMMARY OF THE INVENTION

It is, therefore, an object of the present invention to provide a smart antenna device that offers stable and good performance irrespective of constant envelope characteristics, and a control method thereof.

It is another object of the present invention to provide a smart antenna device that can process data in real time and a method thereof.

It is a further object of the present invention to provide a smart antenna device implemented with a reduced memory capacity and requiring a great volume of computation, and a method thereof.

The above and other objects of the present invention are achieved by providing adaptive beamforming algorithms for an adaptive array smart antenna. According to one aspect of the present invention, the adaptive array smart antenna constructs an input signal matrix with a predetermined number of input signals, computes a transmission signal matrix that minimizes a cost function using a first steering matrix set to an initial value and the input signal matrix, computes a second steering matrix that minimizes the cost function using the transmission signal matrix and the input signal matrix, maps the second steering matrix on a unit circle, constructs a third steering matrix with the mapped values, normalizes the third steering matrix and determining whether the third steering matrix converges, and demodulates data using the transmission signal matrix if the third steering matrix converges.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

The operation of the adaptive array processing unit 105 shown in FIG. 1 by ILSP-SVM (Iterative Least Square Projection based Steering Vector Mapping) according to an embodiment of the present invention will be described. ILSP-SVM does not use constant envelope characteristics and thus there are no constraints imposed on signal characteristics, which is different from ILSP-CMA. In accordance with the embodiment of the present invention, an M×N input signal matrix is constructed upon receipt of N snapshots and processed as a unit block. The embodiment of the present invention, therefore, cannot solve the problem of instantaneously high computation requirement and memory capacity.

In ILSP-SVM, the geometric characteristic of the array antenna is utilized to acquire optimal A and optimal S from the input signal matrix X in equations (7) and (8). In other words, the steering matrix A is mapped using the geometrical characteristic of the array antenna. Assume the array antenna 101 is a uniformly spaced linear antenna array. Then it is possible to map the steering matrix on a unit circle based on the phase difference between steering matrices, which will be described with reference to FIG. 3.

Figure 3:
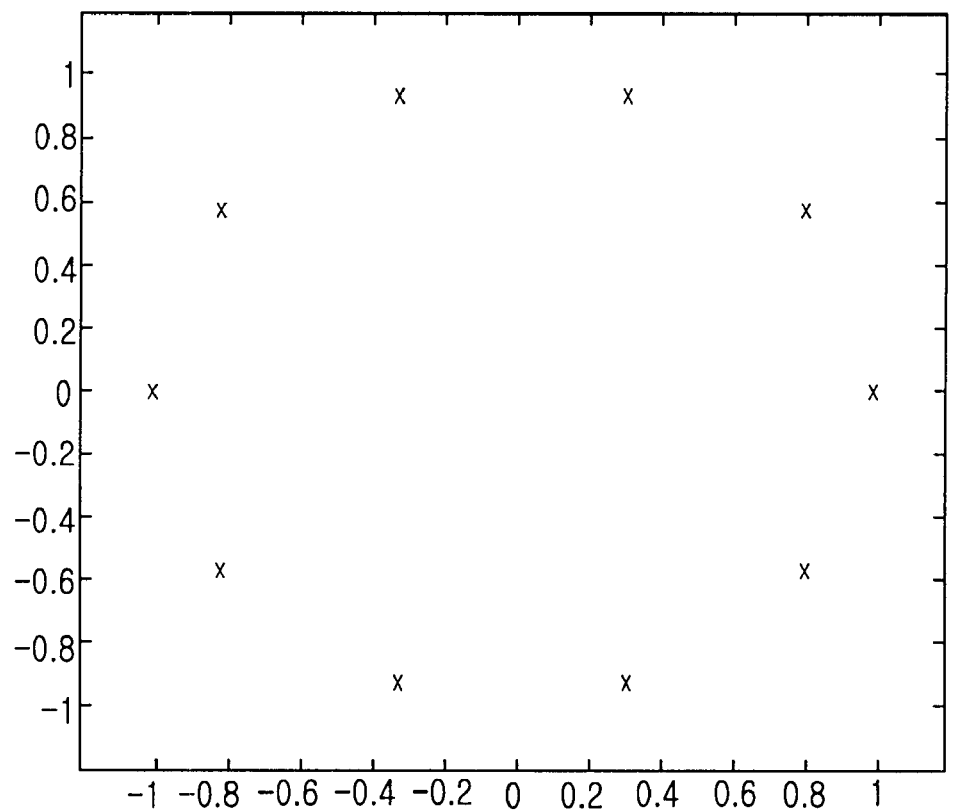
FIG. 3 is a signal constellation diagram of a steering matrix under a specific condition for a smart antenna.

FIG. 3 is a diagram illustrating the constellation of a steering matrix when M=10 and the incident angle is 11.5°. As shown in FIG. 3, each element of the steering matrix lies on the unit circle and the steering matrix is comprised of points forming a unit circle of a radius of 1 with respect to a central point (0, 0). The ILSP-SVM algorithm is performed by mapping the steering matrix $A^i$ based on this characteristic.

Figure 4:
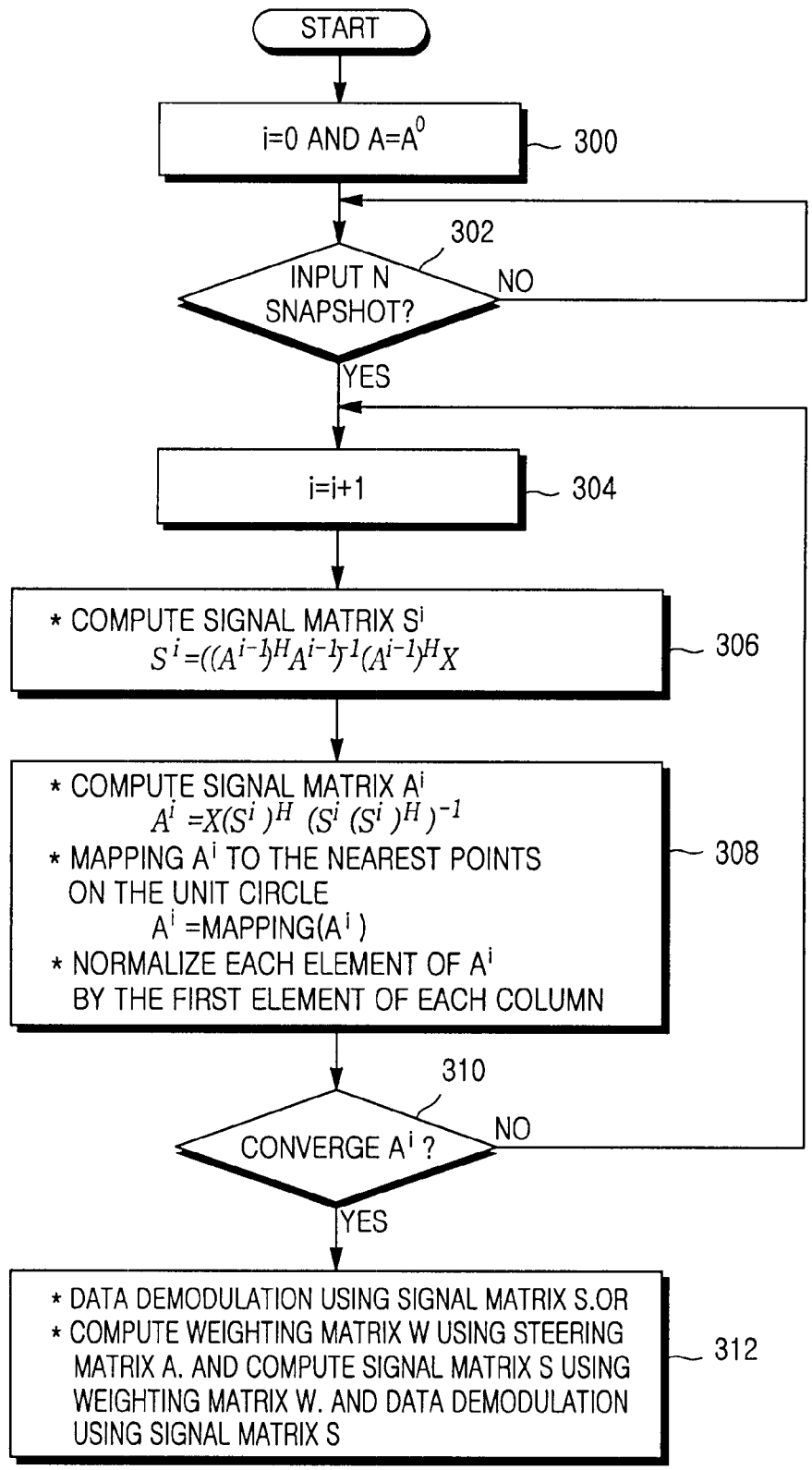
FIG. 4 is a flowchart illustrating the operation of an adaptive array processing unit according to an embodiment of the present invention.

FIG. 4 is a flowchart illustrating the operation of the adaptive array processing unit by ILSP-SVM according to the embodiment of the present invention.

Figure 1:
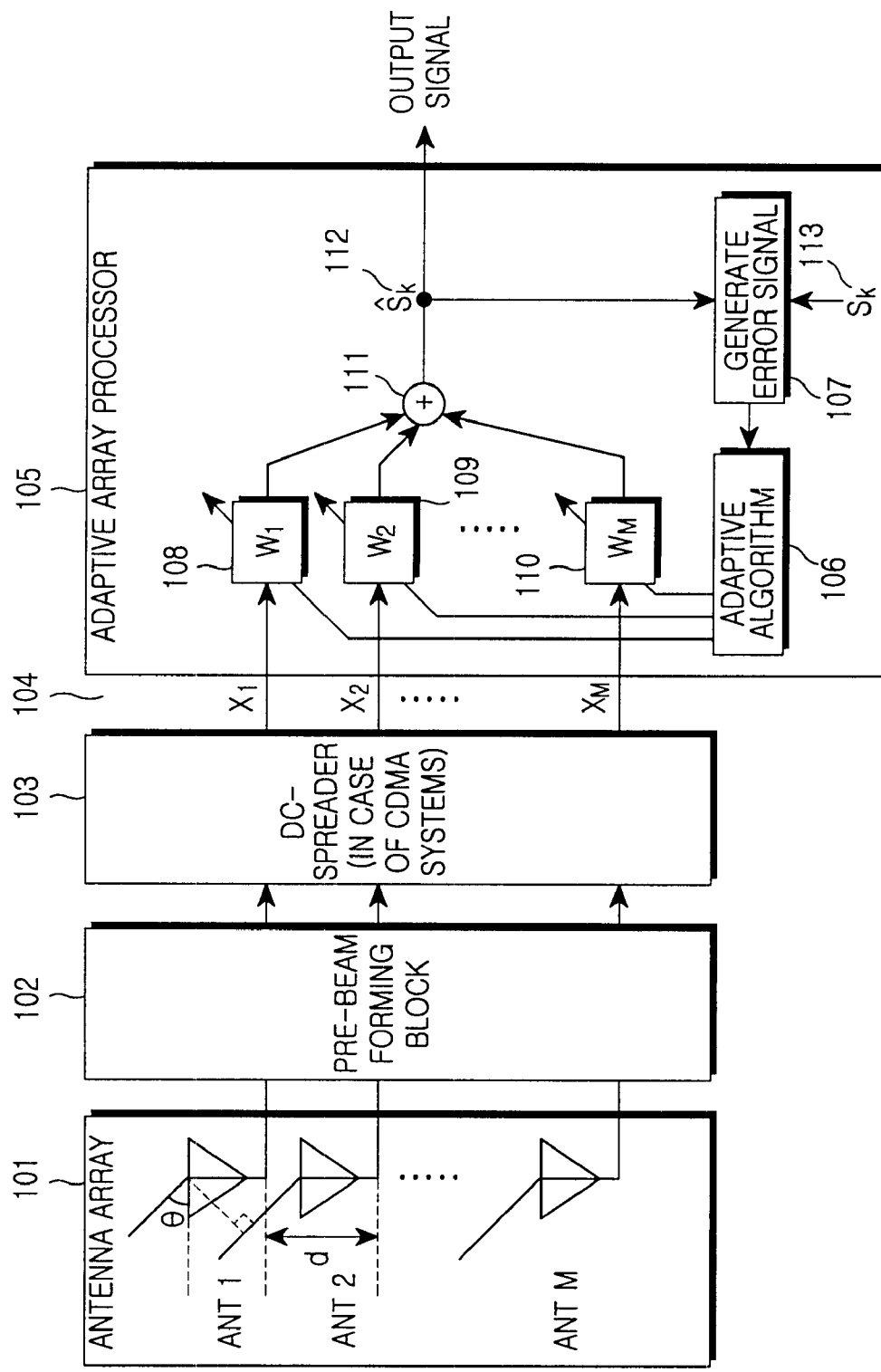
FIG. 1 is a block diagram of a typical adaptive array antenna.

The adaptive array processing unit 105 of FIG. 1 sets the iteration coefficient i to 0 and the steering matrix A to $A^0$ in step 300 and waits until N snapshots are received in step 302 to generate the input signal matrix X. Then, the adaptive array processing unit 105 increases the iteration coefficient i by 1 in step 304. The adaptive array processing unit 105 obtains a transmission signal matrix $S^i$ that minimizes the cost function F(A, S:X) using a steering matrix $A^{i-1}$ by computing a least square solution to equation (9) in step 306. In step 308, the adaptive array processing unit 105 obtains a steering matrix $A^i$ that minimizes the cost function F(A, S:X) by computing a least square solution to equation (10) and maps the steering matrix $A^i$ on the nearest unit circle utilizing the characteristic that it lies on a unit circle. Also, the elements of each column in the steering matrix $A^i$ are normalized by dividing them by the first element in each column vector of the steering matrix $A^i$.

After the normalization, the adaptive array processing unit 105 determines whether the steering matrix $A^i$ converges in step 310. If the steering matrix $A^i$ converges, the adaptive array processing unit 105 proceeds to step 312 and otherwise, it returns to step 304. Steps 304 through 308 are repeated until the convergence of the steering matrix $A^i$.

In step 312, the adaptive array processing unit 105 demodulates data using the transmission signal matrix S. Or it obtains a weight factor W from the steering matrix A, and computes the transmission signal matrix S from the weight factor W prior to data demodulation.

In the case of a CDMA system, despite a plurality of signal sources, interfering signals from signal sources other than a designed signal source are eliminated after dispreading and only the desired signal remains. Then the steering matrix A and the transmission signal matrix S reduce to M×1 and 1×N, respectively. AS a result, the pseudo-inverse result is the same as the Hermitian result. In this case, equations (9) and (10) are simplified to equations (11) and (12), respectively for use in the algorithm of FIG. 4.

$$S^i = (A^{i-1})^H X \tag{11}$$

$$A^i = X(S^i)^H \tag{12}$$

Computations in the ILSP-SVM algorithm are simple and easy in the CDMA system as noted from the above description and the above ILSP-SVM method is applicable to different types of antenna arrays as well as uniformly spaced linear arrays.

Figure 5A:
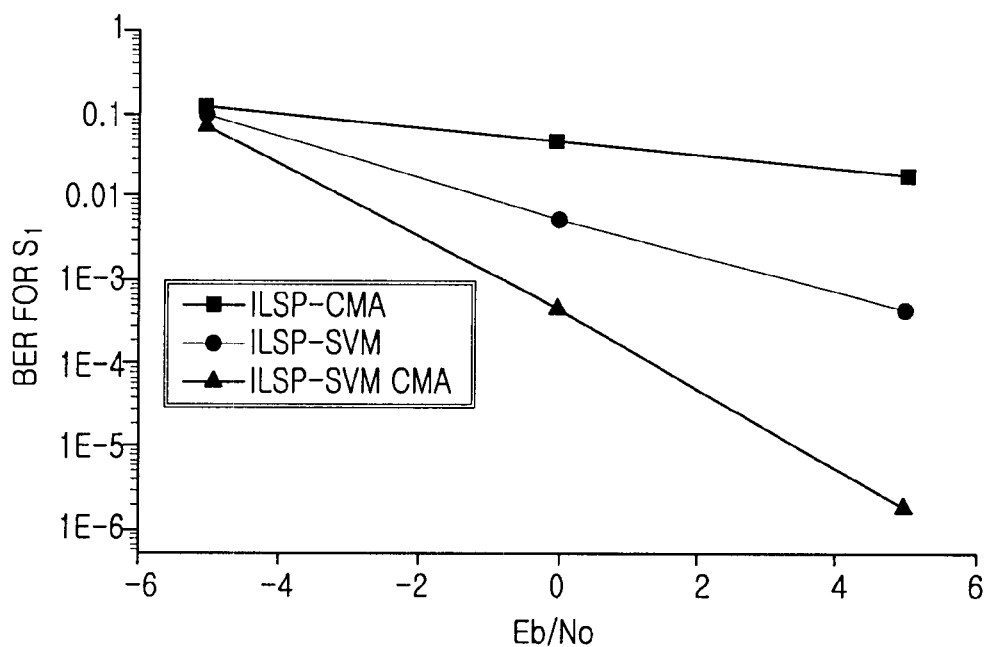
FIGS. 5A, 5B and 5C are graphs showing simulated performances of ILSP-SVM, ILSP-CMA and ILSP-SVMCMA.
Figure 5B:
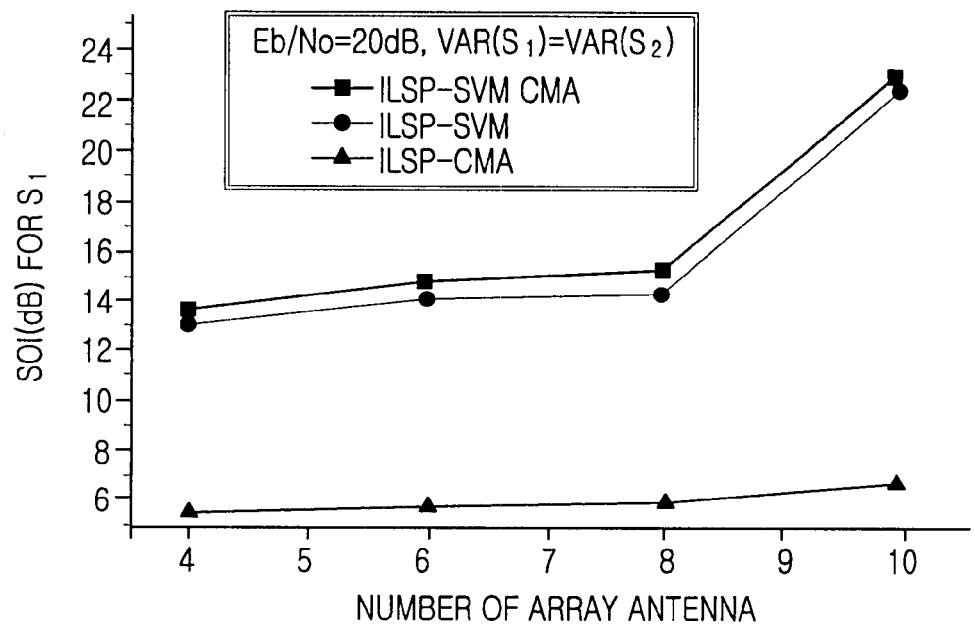
Figure 5C:
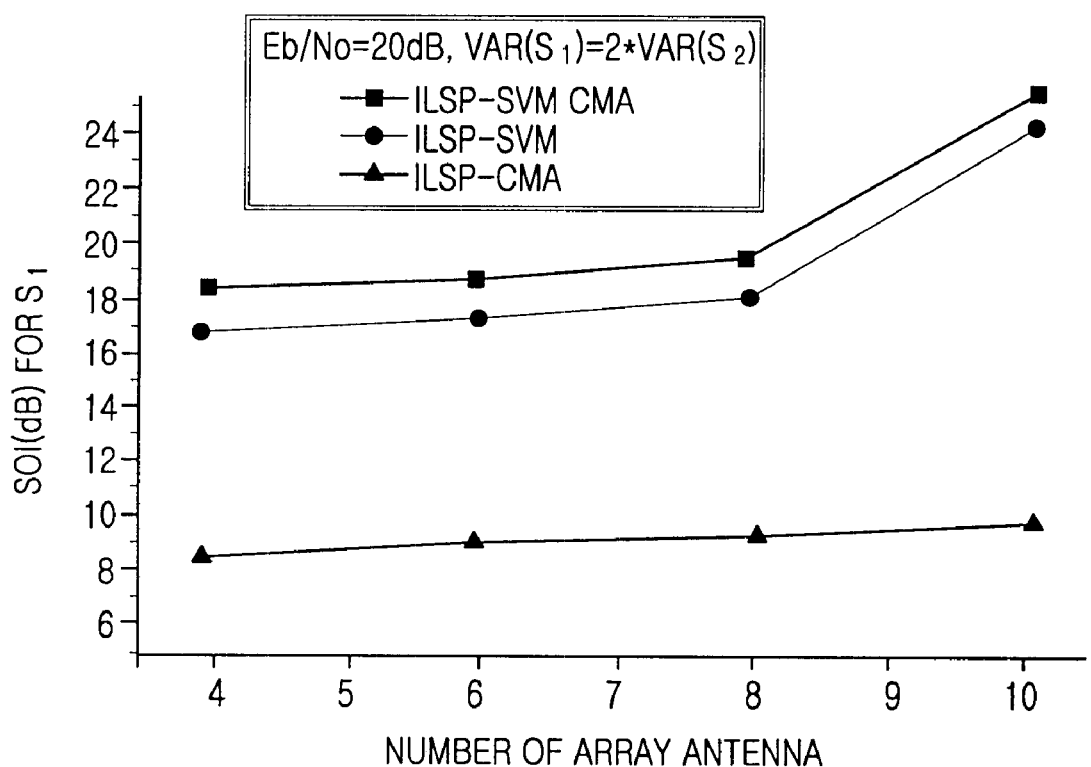

FIGS. 5A, 5B and 5C are graphs showing a performance comparison between the ILSP-SVM method and the ILSP-CMA method in a simulation. The performance comparison was made under the condition that random data incident at 20° and 50° respectively from two users are modulated in BPSK. FIG. 5A is a graph showing a BER (Bit Error Rate) performance comparison for the user of the incident angle 20°, FIG. 5B is a graph showing an SOI (Signal Over Interference) performance comparison when the two users are positioned far from a base station by the same distance, and FIG. 5C is a graph showing an SOI performance comparison when one user is apart from the base station twice the distance between the other user and the base station.

As seen from FIG. 5, the ILSP-SVM method has better performance than the conventional ILSP-CMA method. Moreover, the ILSP-SVM method applies to signals that do not have constant envelopes as well as BPSK modulation signals having constant envelopes because it relies on the characteristic of a steering vector.

The adaptive array processing unit 105 operates by ILSP-SVMCMA (Iterative Least Square Projection based Steering Vector Mapping and Constant Modulus Algorithm) in another embodiment of the present invention. The ILSP-SVMCMA method takes the geometrical characteristic of the array antenna 101 along with the constant envelope characteristic of a signal. In the ILSP-SVMCMA method, an M×N input signal matrix is constructed after N snapshots are received and processed as a unit block. Due to the block processing, a memory of at least a block size is required.

In accordance with the second embodiment of the present invention, both the geometric characteristic of the array antenna and the constant envelope of a transmission signal are utilized to acquire optimal A and optimal S from the input signal matrix X in equations (7) and (8). In other words, the steering matrix A is mapped using the geometrical characteristic of the array antenna and the constant envelope of a transmission signal.

On the assumption that the array antenna 101 is a uniformly spaced linear antenna array, the steering matrix is mapped on a unit circle based on the phase difference between steering matrices, which will be described with reference to FIG. 6.

Figure 6:
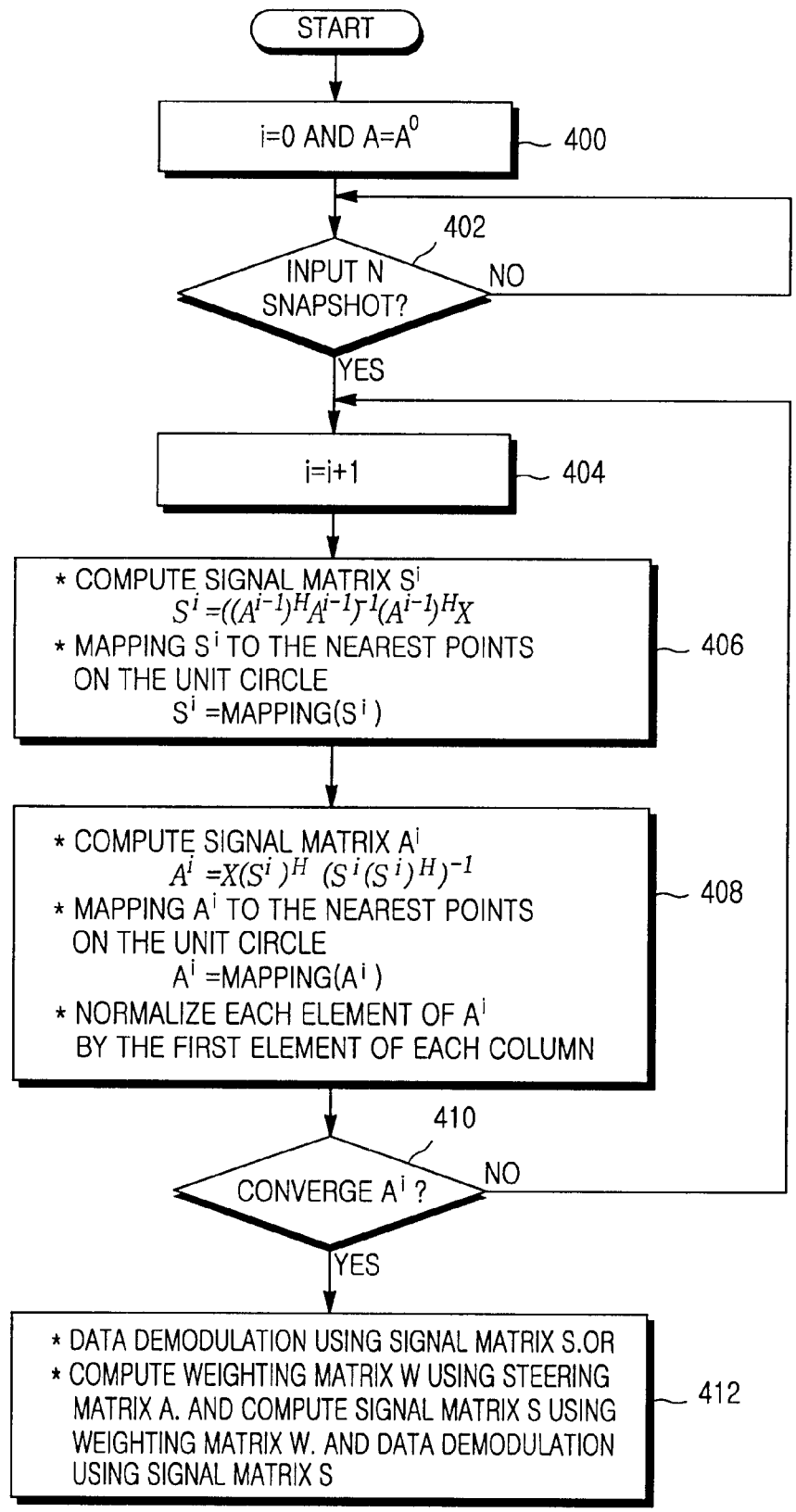
FIG. 6 is a flowchart illustrating the operation of the adaptive array processing unit according to another embodiment of the present invention.

FIG. 6 is a flowchart illustrating the operation of the adaptive array processing unit by ILSP-SVMCMA according to the second embodiment of the present invention.

Figure 2:
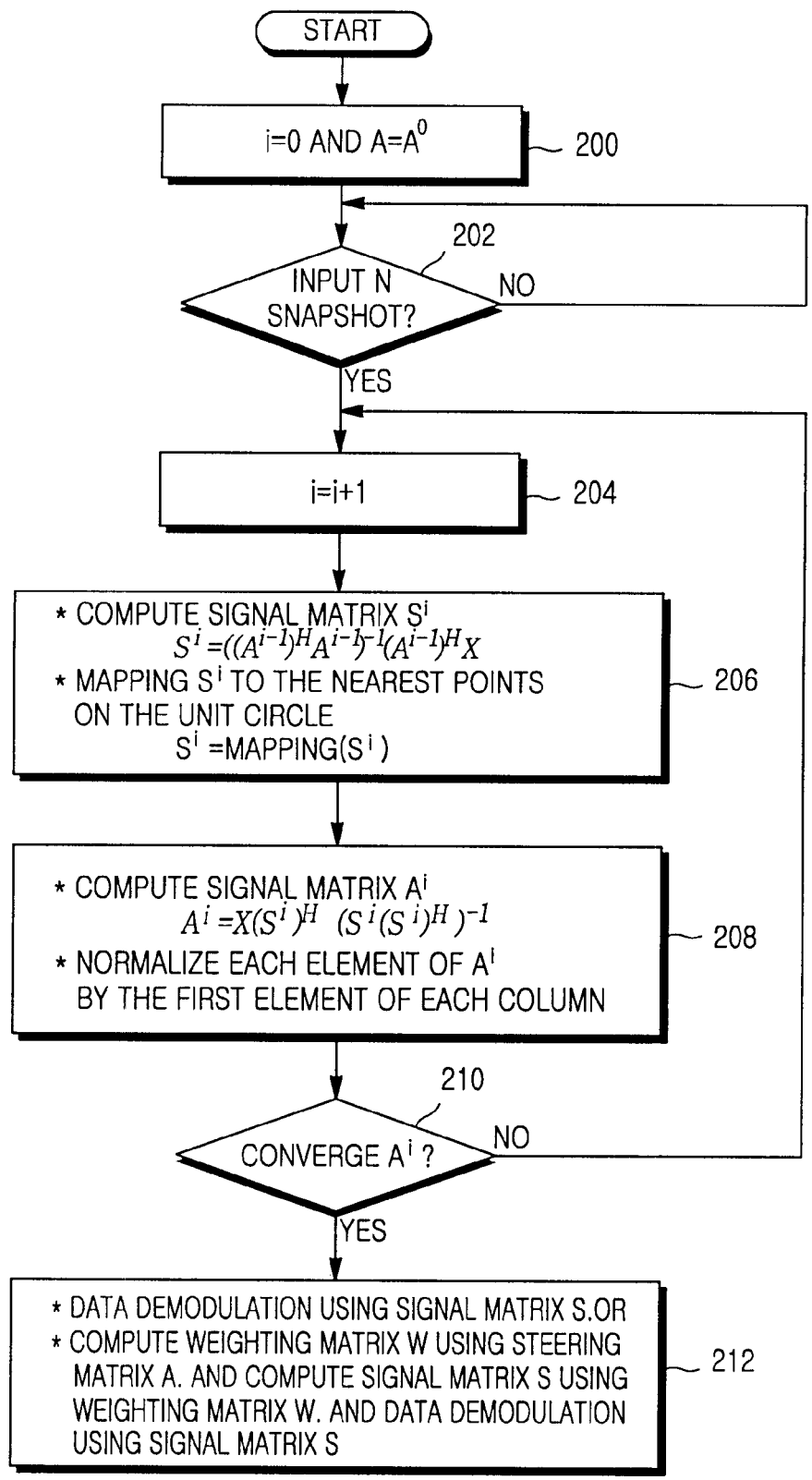
FIG. 2 is a flowchart illustrating an ILSP-CMA method for finding an optimum solution to a squared Frobenius form.

Referring to FIG. 6, the adaptive array processing unit 105 of FIG. 1 sets the iteration coefficient i to 0 and the steering matrix A to $A^0$ in step 400 and waits until N snapshots are received in step 402 to generate the input signal matrix X. Then, the adaptive array processing unit 105 increases the iteration coefficient i by 1 in step 404. The adaptive array processing unit 105 obtains a transmission signal matrix $S^i$ that minimizes the cost function F(A, S:X) using a steering matrix $A^{i-1}$ by computing a least square solution to equation (9) in step 406, as described in connection with FIGS. 2 and 4. Since the transmission signal has a constant envelope, the transmission signal matrix $S^i$ is mapped to the nearest unit circle.

In step 408, the adaptive array processing unit 105 obtains a steering matrix $A^i$ that minimizes the cost function F(A, S:X) by computing a least square solution to equation (10) and maps the steering matrix $A^i$ on the nearest unit circle utilizing the characteristic that it lies on a unit circle. Also, the elements of each column in the steering matrix $A^i$ are normalized by dividing them by the first element in each column vector of the steering matrix $A^i$. After the normalization, the adaptive array processing unit 105 determines whether the steering matrix $A^i$ converges in step 410. If the steering matrix $A^i$ converges, the adaptive array processing unit 105 proceeds to step 412 and otherwise, it returns to step 404. Steps 404 through 408 are repeated until the convergence of the steering matrix $A^i$.

In step 412, the adaptive array processing unit 105 demodulates data using the transmission signal matrix S. Or it obtains a weight factor W from the steering matrix A, and computes the transmission signal matrix S from the weight factor W prior to data demodulation.

As in the first embodiment, interfering signals from signal sources other than a designed signal source are eliminated and only the desired signal remains after dispreading in a CDMA system. Then the steering matrix A and the transmission signal matrix S reduce to M×1 and 1×N, respectively, which facilitates computations for the matrixes A and S.

The above ILSP-SVMCMA method is applicable to different types of antenna arrays as well as uniformly spaced linear arrays and exhibits better performance than the conventional ILSP-CMA method as shown in FIGS. 5A, 5B and 5C.

In accordance with the second embodiment of the present invention, the ILSP-SVMCMA method has better performance than the conventional ILSP-CMA method and the ILSP-SVM method of the first embodiment due to the contemporaneous use of the geometrical characteristic of the array antenna and the constant envelope of a signal. Especially in a CDMA system, the matrices S and A are simply computed since dispreading is performed. The resulting rapid computations ensure real time processing.

ILSP involved with the conventional ILSP-CMA and the adaptive algorithms of the present invention will be described with reference to FIG. 7.

Figure 7:
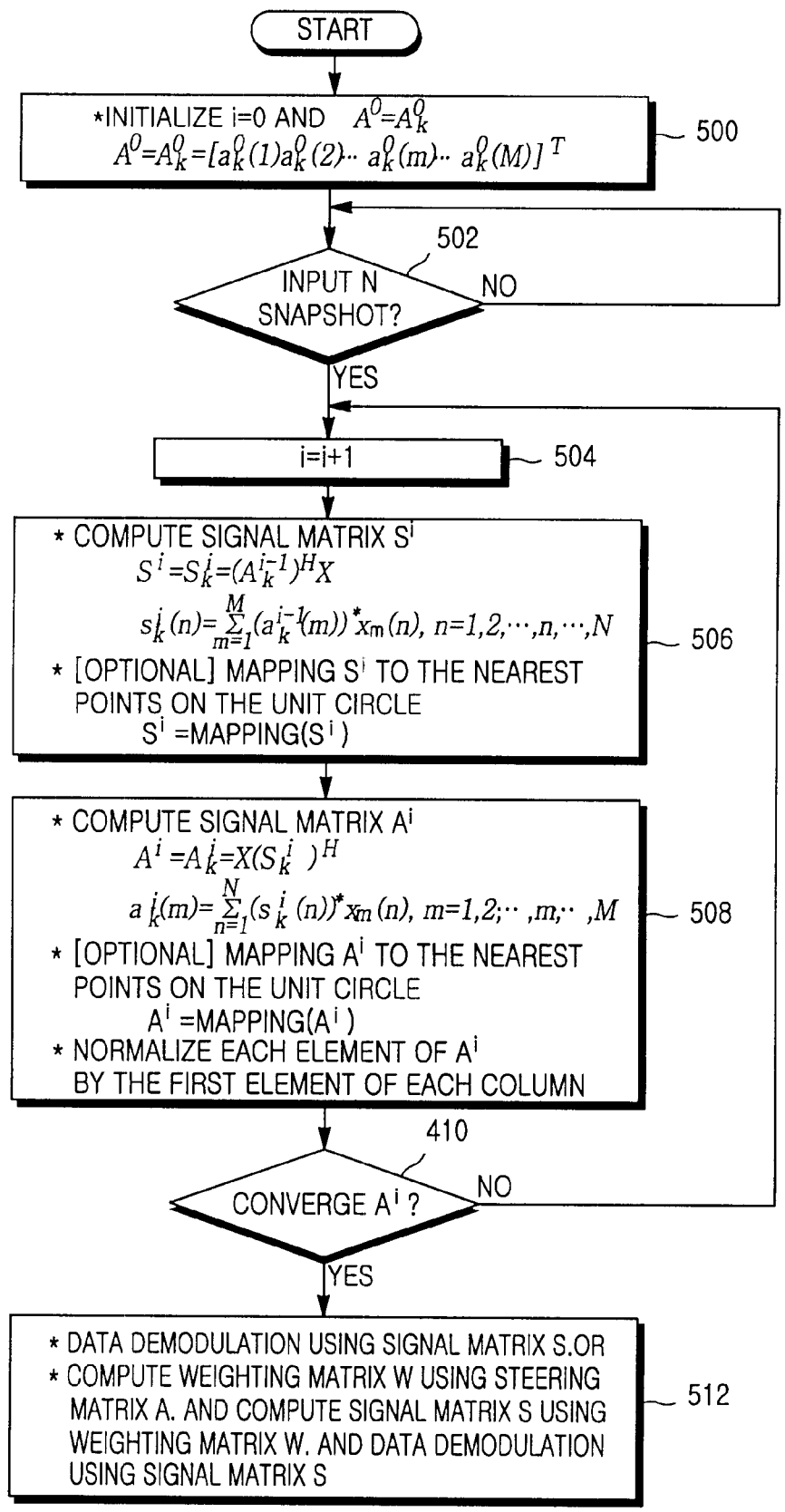
FIG. 7 is a flowchart illustrating the operation of the adaptive array processing unit by ILSP.

FIG. 7 is a flowchart illustrating the operation of the adaptive array processing unit by ILSP using block processing. For convenience's sake, the following description is made in the context of a CDMA system. Thus, the matrices S and A are computed by equations (11) and (12). As described before, in the case of any other system, equations (9) and (11) are applied to compute the matrices S and A instead.

Referring to FIGS. 1 to 7, the adaptive array processing unit 105 of FIG. 1 sets the iteration coefficient i to 0 and the steering matrix A to $A_k^0$ in step 500. Here, $$A_0 = A_k^0 = [a_k^0(1) a_k^0(2) \ldots a_k^0(m) \ldots a_k^0(M)]^T \quad (13)$$

In step 502, the adaptive array processing unit 105 receives N snapshots and generates the input signal matrix X. Then, the adaptive array processing unit 105 increases the iteration coefficient i by 1 in step 504.

The adaptive array processing unit 105 obtains a transmission signal matrix $S^i$ that minimizes the cost function F(A, S:X) using a steering matrix $A^{-1}$ by computing a least square solution in step 506 as follows.

$$S^i = S_k^i = (A_k^{i-1})^H X \quad (14)$$

$$s_k^i(n) = \sum_{m=1}^M (a_k^{i-1}(m)) \cdot x_m(n), \quad n = 1, 2, \ldots, n, \ldots, N$$

Only if a transmission signal has a constant envelope, the transmission signal matrix $S^i$ is mapped to the nearest unit circle.

In step 508, the adaptive array processing unit 105 obtains a steering matrix $A^i$ that minimizes the cost function F(A, S:X) by computing a least square solution using the transmission signal matrix $S^i$ by $$A^i = A_k^i = X(S_k^i)^H \quad (15)$$

$$a_k^i(m) = \sum_{n=1}^N (s_k^i(n)) \cdot X_m(n), \quad m = 1, 2, \ldots, m, \ldots, M$$

The steering matrix $A^i$ is mapped to the nearest unit circle utilizing the characteristic that it lies on a unit circle. Also, the elements of each column in the steering matrix $A^i$ are normalized by dividing them by the first element in each column vector of the steering matrix $A^1$.

After the normalization, the adaptive array processing unit 105 determines whether the steering matrix $A^i$ converges in step 510. If the steering matrix $A^i$ converges, the adaptive array processing unit 105 proceeds to step 512 and otherwise, it returns to step 504. Steps 504 through 508 are repeated until the convergence of the steering matrix $A^i$.

In step 512, the adaptive array processing unit 105 demodulates data using the transmission signal matrix S. Or it obtains a weight factor W from the steering matrix A, and computes the transmission signal matrix S from the weight factor W prior to data demodulation.

In the above ILSP method, the steering matrix A and the transmission signal matrix S are estimated each time N snapshots are received. Even if the steering matrix is initially in a normal state, the steering matrix A converges after an average of three or four iterations to thereby recover M steering vectors and N transmission signals. If three iterations are done, the computation requirement is proportional to 3MN.

The adaptive array processing unit 105 operates by SLSP (Sequential Least Square Projection) in a third embodiment of the present invention. In the SLSP method, a solution is computed for each input signal. The sequential computations of input signals enable high-speed processing and thus make the SLSP method suitable for real time data processing with good performance, unlike the above ILSP methods. In the SLSP method, each input signal sample is processed at each time it is received, thereby avoiding the latency of at least a block size and block processing of input signals. As a result, there is no high instantaneous computation requirement and computations can be distributed. This means that the SLSP method is suitable for real time processing.

Figure 8:
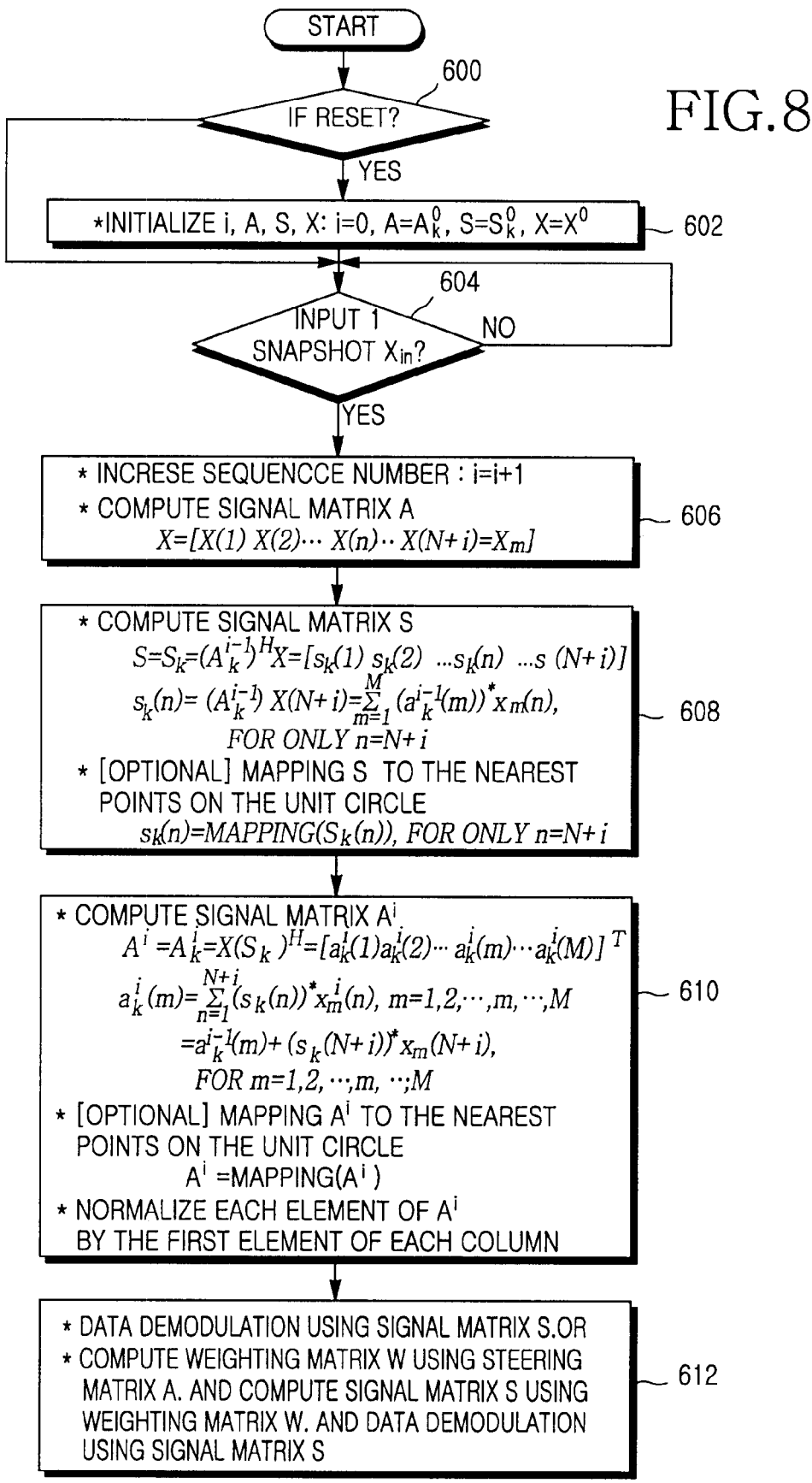
FIG. 8 is a flowchart illustrating the operation of the adaptive array processing unit according to a third embodiment of the present invention.

FIG. 8 is a flowchart illustrating the operation of the adaptive array processing unit by SLSP according to the third embodiment of the present invention.

For better understanding of the SLSP method, its description is made in the context of a CDMA system. Therefore, the matrices S and A are computed by equations (11) and (12).

Referring to FIG. 8, the adaptive array processing unit 105 of FIG. 1 determines whether it is an initialization state in step 600. In the case of an initialization state, the adaptive array processing unit 105 initializes parameters in step 602. If parameter initialization is not needed, the adaptive array processing unit 105 jumps to step 604. In step 602, the adaptive array processing unit 105 sets a sequence number i to 0, the steering matrix A to $A^{k0}$ expressed as equation (13), the transmission signal matrix S to $S^{k0}$ expressed as $$S = S_k = [s_k(1) s_k(2) \ldots s_k(n) \ldots s_k(N)] \quad (16)$$

and the input signal matrix X to $X_0$ expressed as $$X = X_0 = [X(1) X(2) \ldots X(n) \ldots X(N)] \quad (17)$$

In step 604, the adaptive array processing unit 105 determines whether an input signal $X_{in}$ of one snapshot has been received. Upon receipt of the signal $X_{in}$, the adaptive array processing unit 105 goes to step 606 and otherwise, it awaits receipt of the signal $X_{in}$. The adaptive array processing unit 105 increases a sequence number i by 1 and updates the input signal matrix X by $$X = [X(1) X(2) \ldots X(n) \ldots X(N+i) = X_{in}] \quad (18)$$

That is, one element is added to the input signal matrix X at each input. In step 608, the adaptive array processing unit 105 obtains the transmission signal matrix A that minimizes the cost function F(A, S:X) by computing a least square solution using a steering matrix $A^{i-1}$ by $$S = S_k = (A_k^{i-1})^H X \quad (19)$$
$$= [s_k(1) s_k(2) \ldots s_k(n) \ldots s_k(N+i)]$$
$$s_k(n) = (A_k^{i-1})^H X(N+i)$$
$$= \sum_{m=1}^{M} (a_k^{i-1}(m)) \cdot x_m(n), \text{ for only } n = N+i$$

As noted in equation (19), $S=S_k$ only for $S_k(n=N+i)$. If the transmission signal has a constant envelope, the transmission signal matrix S is mapped to the nearest unit circle. In this case, the mapping of the transmission signal matrix S is also done only if n=N+i. This is expressed as $$s_k(n) = \text{mapping}(s_k(n)), \text{ for only } n=N+i \quad (20)$$

Mapping is performed on a new input signal as noted in equation (20). After the mapping, the adaptive array processing unit 105 obtains a steering matrix $A^i$ that minimizes the cost function F(A, S:X) by computing a least square solution using the transmission signal matrix S in step 610 by $$A^i = A_k^i = X(S_k)^H \quad (21)$$
$$= [a_k^i(1) a_k^i(2) \ldots a_k^i(m) \ldots a_k^i(M)]^T$$
$$a_k^i(m) = \sum_{n=1}^{N+1} (s_k(n)) \cdot x_m^i(n), m = 1, 2, \ldots, m, \ldots, M$$
$$= a_k^{i-1}(m) + (s_k(N+i) \cdot x_m(N+i), \text{ for }$$
$$m = 1, 2, \ldots, m, \ldots, M$$

The steering matrix $A^i$ is mapped to the nearest unit circle utilizing the characteristic that it lies on a unit circle. Also, the elements of each column in the steering matrix $A^i$ are normalized by dividing them by the first element in each column vector of the steering matrix $A^i$. After the normalization, the adaptive array processing unit 105 goes to step 612. Compared to the ILSP methods, iterative computations are not performed according to whether the steering matrix A converges or not.

In step 612, the adaptive array processing unit 105 demodulates data using the transmission signal matrix S. Or it obtains a weight factor W from the steering matrix A, and computes the transmission signal matrix S from the weight factor W prior to data demodulation.

In accordance with the third embodiment of the present invention, a new steering vector is calculated each time one snapshot is received. In the calculation of the new steering vector, only the received snapshot signal and the previous steering vector are used, thus requiring a small amount of computation proportional to M.

The adaptive array processing unit 105 operates by SLSP-MA (Sequential Least Square Projection with Moving Average) in a fourth embodiment of the present invention. In the SLSP-MA method, a solution is computed for each input signal using an MA.

The sequential treatment of input signals enables high-speed processing and thus makes the SLSP-MA method suitable for real time data processing, unlike the above ILSP methods. The SLSP-MA method computes a solution for each input signal at its reception time using the MS of a total of N snapshots, taking the concept of the SLSP method. Since each input signal sample is processed at each time it is received, the problems of latency of at least a block size and high instantaneous computation requirement are avoided.

Figure 9:
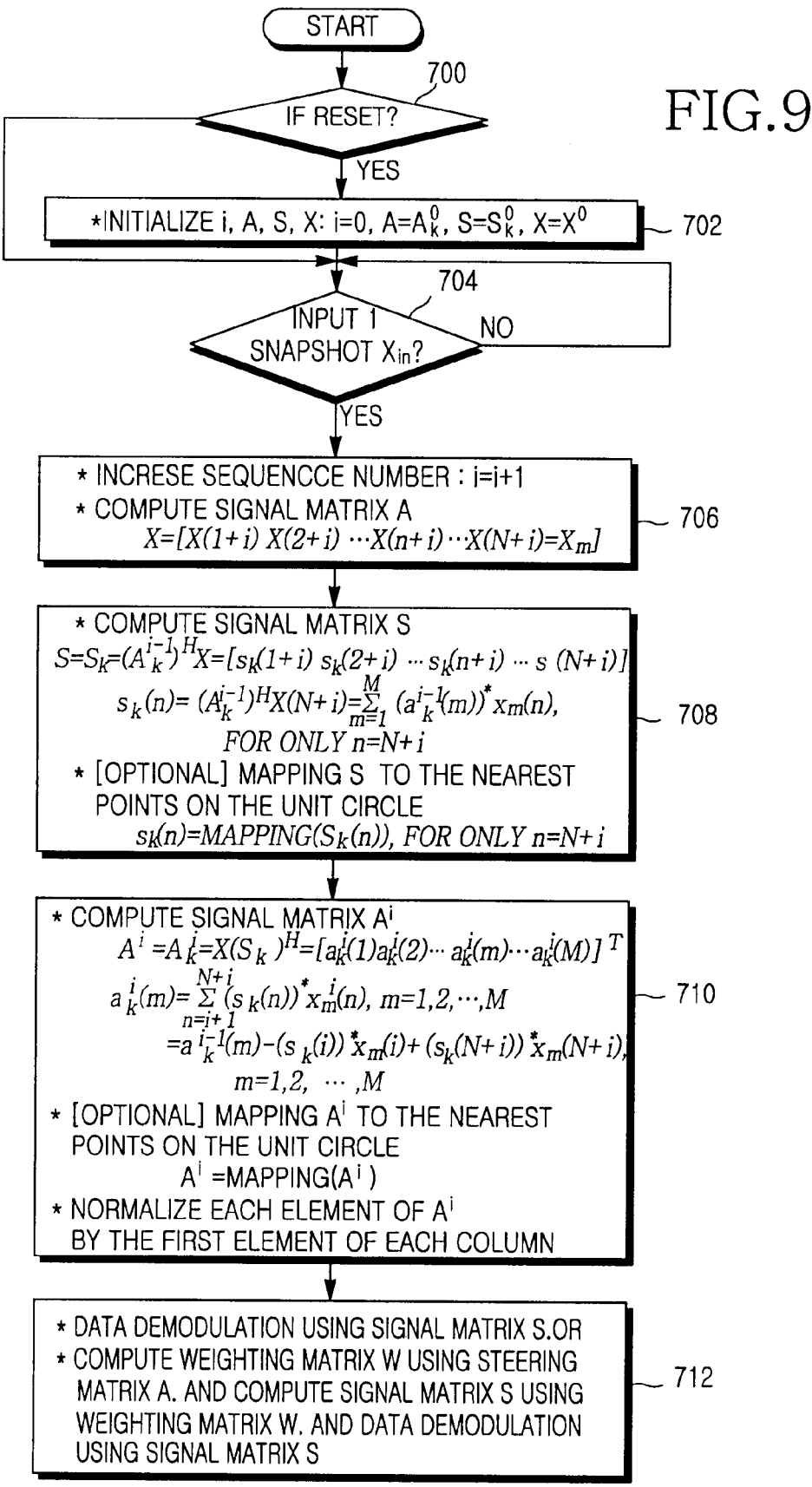
FIG. 9 is a flowchart illustrating the operation of the adaptive array processing unit according to a fourth embodiment of the present invention.

FIG. 9 is a flowchart illustrating the operation of the adaptive array processing unit by SLSP-MA according to the fourth embodiment of the present invention.

For better understanding of the SLSP-MA method, its description is made in the context of a CDMA system. Therefore, the matrices S and A are computed by equations (11) and (12).

Referring to FIG. 9, the adaptive array processing unit 105 of FIG. 1 determines whether it is an initialization state in step 700. In the case of an initialization state, the adaptive array processing unit 105 initializes parameters in step 702. If parameter initialization is not needed, the adaptive array processing unit 105 jumps to step 704. In step 702, the adaptive array processing unit 105 sets a sequence number i to 0, the steering matrix A to $A_k^0$ expressed as equation (13), the transmission signal matrix S to $S_k^0$ expressed as equation (16), and the input signal matrix X to $X^0$ expressed as equation (17).

In step 704, the adaptive array processing unit 105 determines whether an input signal $X_{in}$ of one snapshot has been received. Upon receipt of the signal $X_{in}$, the adaptive array processing unit 105 goes to step 706 and otherwise, it awaits receipt of the signal $X_{in}$.

In step 706, the adaptive array processing unit 105 increases the sequence number i by 1 and updates the input signal matrix X by $$X=[X(1+i)X(2+i) \ldots X(n+i) \ldots X(N+i)=X_{in}] \quad (22)$$

In step 708, the adaptive array processing unit 105 obtains the transmission signal matrix S that minimizes the cost function F(A, S:X) by computing a least square solution using a steering matrix $A^{i-1}$ by $$S = S_k = (A_k^{i-1})^H X \quad (23)$$
$$= [s_k(1+i) s_k(2+i) \ldots s_k(n+i) \ldots s_k(N+i)]$$
$$s_k(n) = (A_k^{i-1})^H X(N+i)$$
$$= \sum_{m=1}^{M} (a_k^{i-1}(m)) \cdot x_m(n), \text{ for only } n = N+i$$

As noted in equation (23), $S=S_k$ only for $S_k(n=N+i)$. If the transmission signal has a constant envelope, the transmission signal matrix S is mapped to the nearest unit circle. In this case, the mapping of the transmission signal matrix S is also done only if n=N+i as in equation (20).

After the mapping, the adaptive array processing unit 105 obtains a steering matrix $A^i$ that minimizes the cost function F(A, S:X) by computing a least square solution using the transmission signal matrix S in step 710 by $$A^i = A_k^i = X(S_k)^H \quad (24)$$
$$= ([a_k^i(1) a_k^i(2) \ldots a_k^i(m) \ldots a_k^i(M)])^T$$
$$a_k^i(m) = \sum_{n=1}^{N+1} (s_k(n)) \cdot x_m^i(n), m = 1, 2, \ldots, m, \ldots, M$$
$$= a_k^{i-1}(m) - (s_k(i) \cdot x_m(i) + (s_k(N+i)) \cdot x_m(N+i),$$
$$\text{for } m = 1, 2, \ldots, m, \ldots, M$$

The steering matrix $A^i$ can be mapped to the nearest unit circle utilizing the characteristic that it lies on a unit circle. Also, the elements of each column in the steering matrix $A^i$ are normalized by dividing them by the first element in each column vector of the steering matrix $A^i$.

In step 712, the adaptive array processing unit 105 demodulates data using the transmission signal matrix S. Or it obtains a weight factor W from the steering matrix A, and computes the transmission signal matrix S from the weight factor W prior to data demodulation.

In accordance with the fourth embodiment of the present invention, when an $(N+i)^{th}$ signal is received, the influence of an $i^{th}$ signal that is the oldest information and the influence of the $(N+i)^{th}$ signal is added in the process of updating the steering vector. N complex multiplications and M−1 complex additions are needed to update the transmission signal matrix S, and M complex multiplications and 2M complex additions are needed to update the steering matrix A. Therefore, the computation requirement is proportional to 2M complex multiplications and 3M−1 complex additions.

The adaptive array processing unit 105 operates by SLSP-FM (Sequential Least Square Projection with Forgetting Memory) in a fifth embodiment of the present invention. In the SLSP-FM method suitable for real time processing, a solution is computed for each input signal using a forgetting factor. Since each input signal sample is processed at each time it is received, the problems of block processing are avoided.

Figure 10:
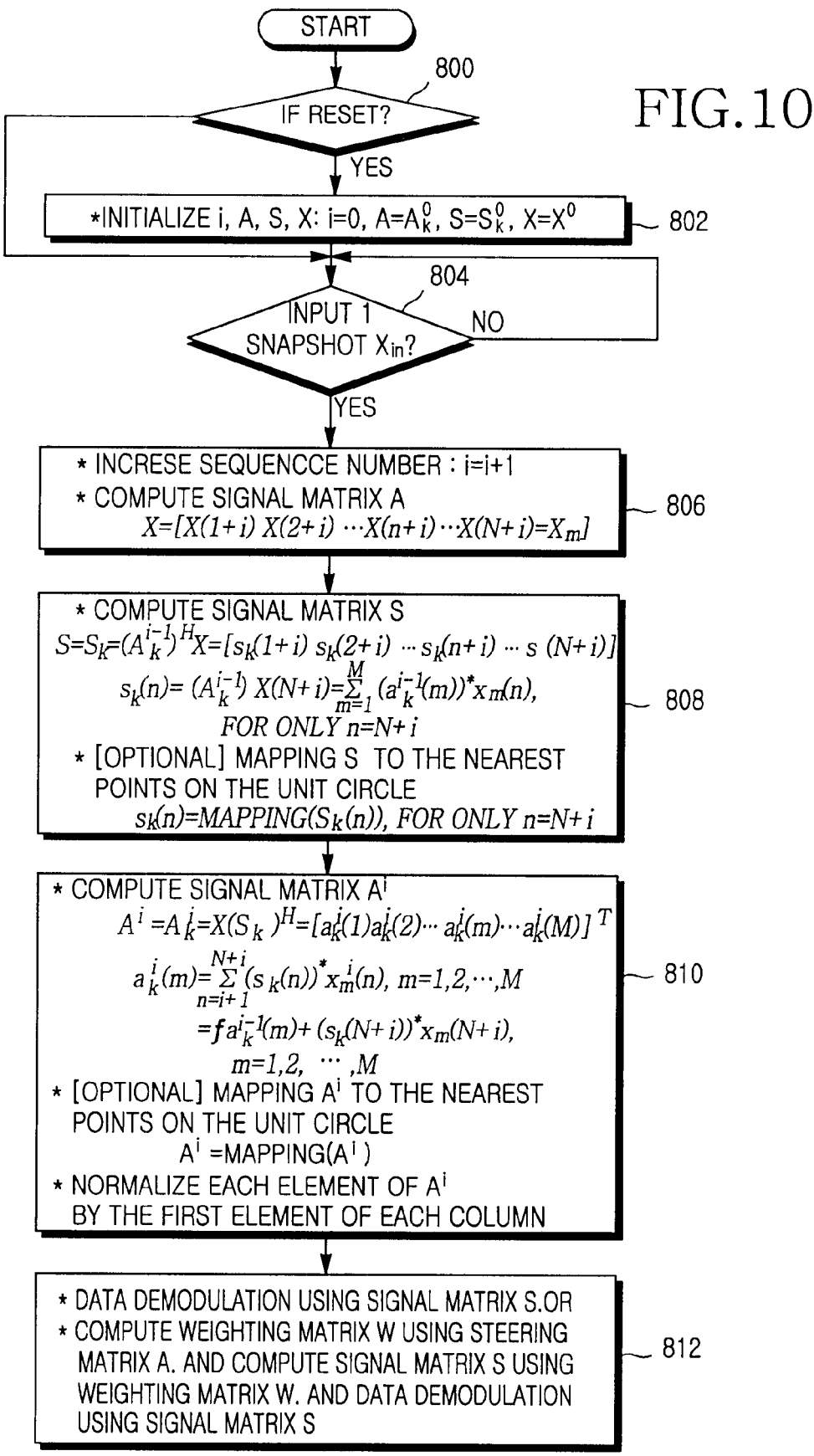
FIG. 10 is a flowchart illustrating the operation of the adaptive array processing unit according to a fifth embodiment of the present invention.

FIG. 10 is a flowchart illustrating the operation of the adaptive array processing unit by SLSP-FM according to the fifth embodiment of the present invention.

For better understanding of the SLSP-FM method, its description is made in the context of a CDMA system. Therefore, the matrices S and A are computed by equations (1) and (12).

Referring to FIG. 10, the adaptive array processing unit 105 of FIG. 1 determines whether it is an initialization state in step 800. In the case of an initialization state, the adaptive array processing unit 105 initializes parameters in step 802. If parameter initialization is not needed, the adaptive array processing unit 105 jumps to step 804. In step 802, the adaptive array processing unit 105 sets a sequence number i to 0, the steering matrix A to $A_k^0$ expressed as equation (13), the transmission signal matrix S to $S_k^0$ expressed as equation (16), and the input signal matrix X to $X^0$ expressed as equation (17).

In step 804, the adaptive array processing unit 105 determines whether an input signal $X_{in}$ of one snapshot has been received. Upon receipt of the signal $X_{in}$, the adaptive array processing unit 105 goes to step 806 and otherwise, it awaits receipt of the signal $X_{in}$.

In step 806, the adaptive array processing unit 105 increases the sequence number i by 1 and updates the input signal matrix X by equation (22).

In step 808, the adaptive array processing unit 105 obtains the transmission signal matrix S that minimizes the cost function F(A, S:X) by computing a least square solution using a steering matrix $A^{i-1}$ by equation (23). If the transmission signal has a constant envelope, the transmission signal matrix S is mapped to the nearest unit circle. In this case, the mapping of the transmission signal matrix S is also done only if n=N+i as in equation (20).

After the mapping, the adaptive array processing unit 105 obtains a steering matrix $A^i$ that minimizes the cost function F(A, S:X) by computing a least square solution using the transmission signal matrix S in step 810 by $$A^i = A_k^i = X(S_k)^H \quad (25)$$
$$= [a_k^i(1) a_k^i(2) \ldots a_k^i(m) \ldots a_k^i(M)]^T$$

$$a_k^i(m) = \sum_{n=i+1}^{N+1} (s_k(n)) \cdot x_m^i(n), m = 1, 2, \ldots, m, \ldots, M$$
$$= f a_k^{i-1}(m) - (s_k(N+i)) \cdot x_m(N+i),$$
$$m = 1, 2, \ldots, m, \ldots, M$$
$$\sum_{n=i+1}^{N+1} f^{N+i-k}(s_k(n)) \cdot x_m^i(n), m = 1, 2, \ldots, m, \ldots, M$$

The steering matrix $A^i$ can be mapped to the nearest unit circle utilizing the characteristic that it lies on a unit circle. Also, the elements of each column in the steering matrix $A^i$ are normalized by dividing them by the first element in each column vector of the steering matrix $A^i$.

In step 812, the adaptive array processing unit 105 demodulates data using the transmission signal matrix S. Or it obtains a weight factor W from the steering matrix A, and computes the transmission signal matrix S from the weight factor W prior to data demodulation.

In accordance with the fifth embodiment of the present invention, the steering vector is updated by multiplying the previous steering vector by a forgetting factor f, obviating the need of an additional memory. When a new $(N+i)^{th}$ signal is received, the forgetting factor is used to eliminate the influence of an $i^{th}$ signal that is the oldest information. N complex multiplications and M−1 complex additions are needed to update the transmission signal matrix S, and 1.25M complex multiplications and M complex additions are needed to update the steering matrix A. Therefore, the computation requirement is proportional to 2.25M complex multiplications and 2M−1 complex additions.

Figure 11:
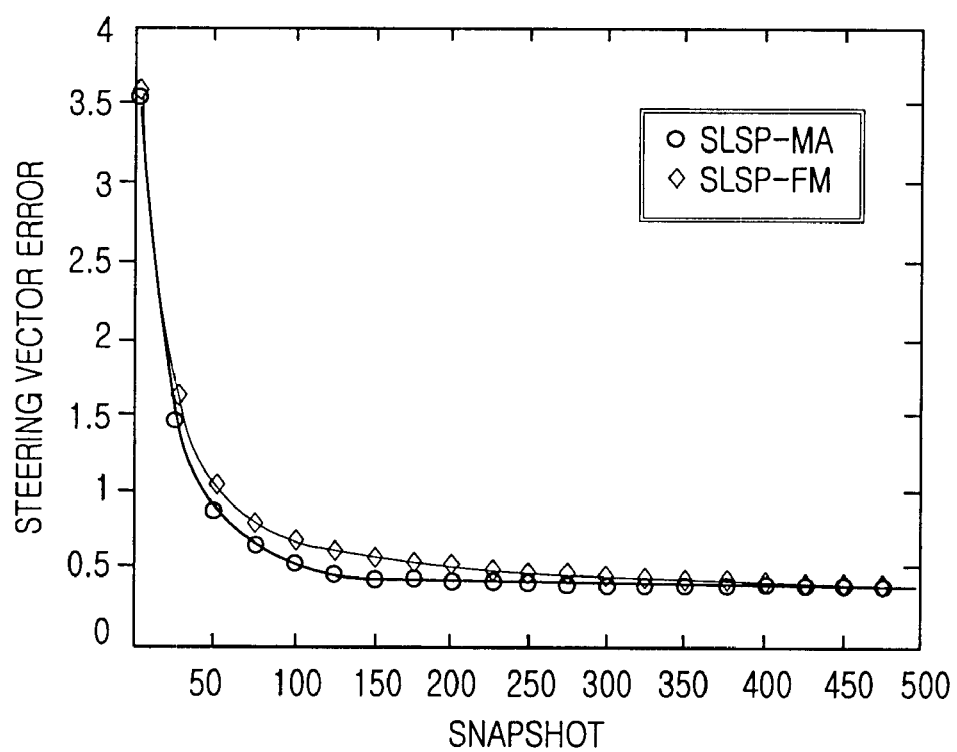
FIG. 11 is a graph showing simulated convergence speeds of steering vectors in SLSP-MA and SLSP-FM.

FIG. 11 is a graph showing convergence speeds of a steering vector in SLSP-MA and SLSP-FM in a simulation. Here, Eb/No=−4 dB and N=100. As seen from FIG. 11, the steering vector converges after about 100 snapshots.

Figure 12:
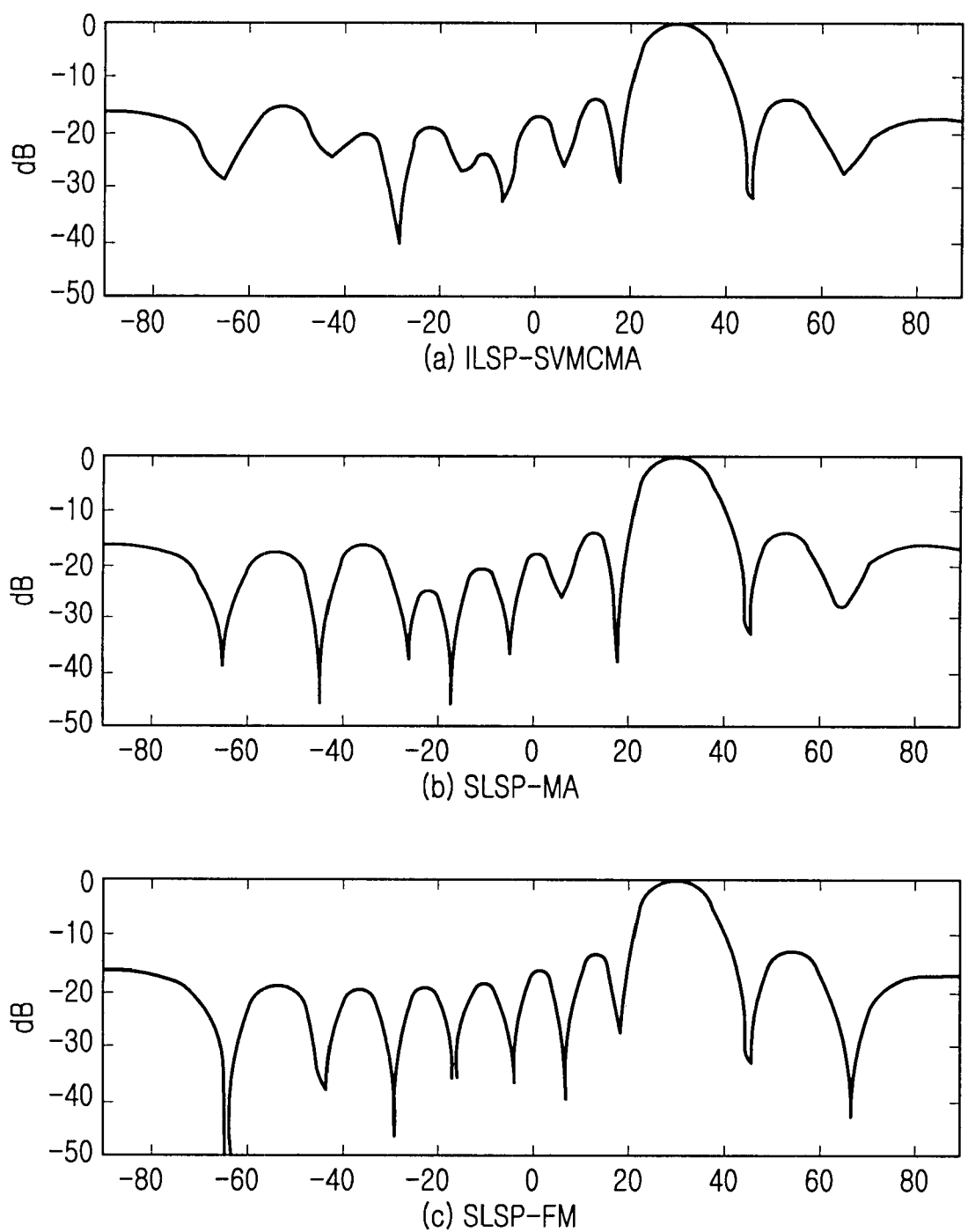
FIGS. 12A, 12B and 12C illustrate simulated beam patterns in the second, fourth and fifth embodiments of the present invention.

FIGS. 12A, 12B and 12C illustrate simulated beam patterns in the second, fourth and fifth embodiments of the present invention. The simulation was performed under the conditions that an incident angle =30°, EB/No=−4 dB, M=10, and CDMA system throughput gain PG=63. Beamformation is well performed in the embodiments.

Figure 13:
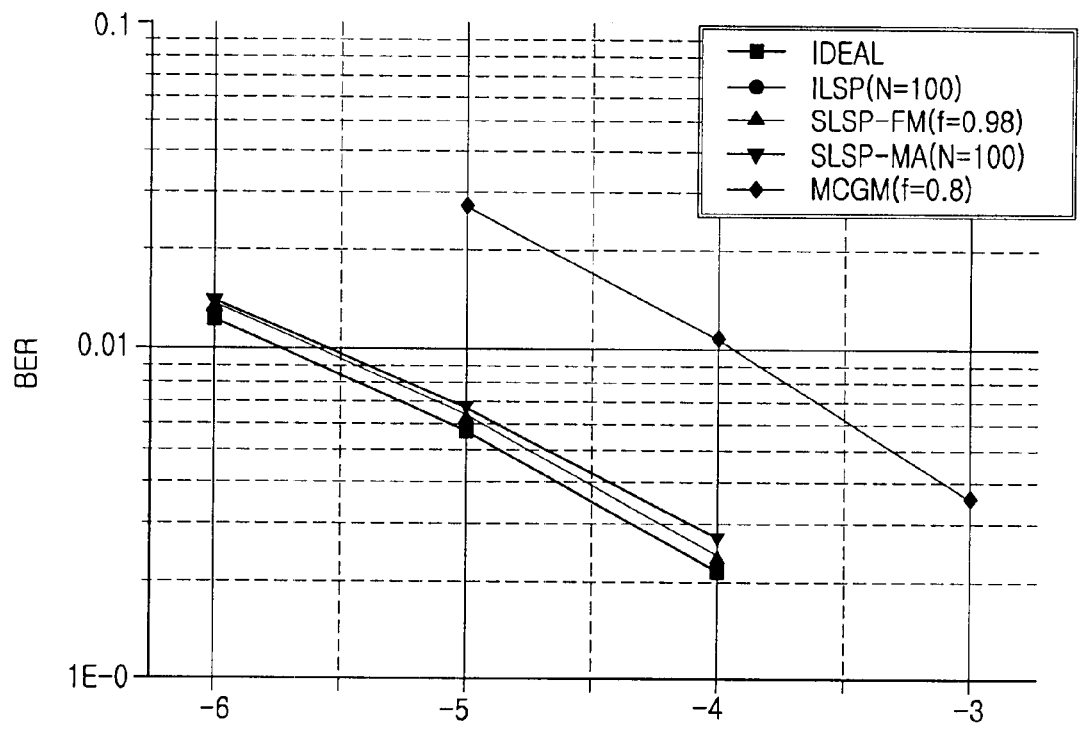
FIGS. 13A and 13B illustrate graphs showing simulated BER performances for users under an AWGN environment under the conditions of M=10, BPSK modulation, and CDMA throughput gain PG=63.
Figure 13:
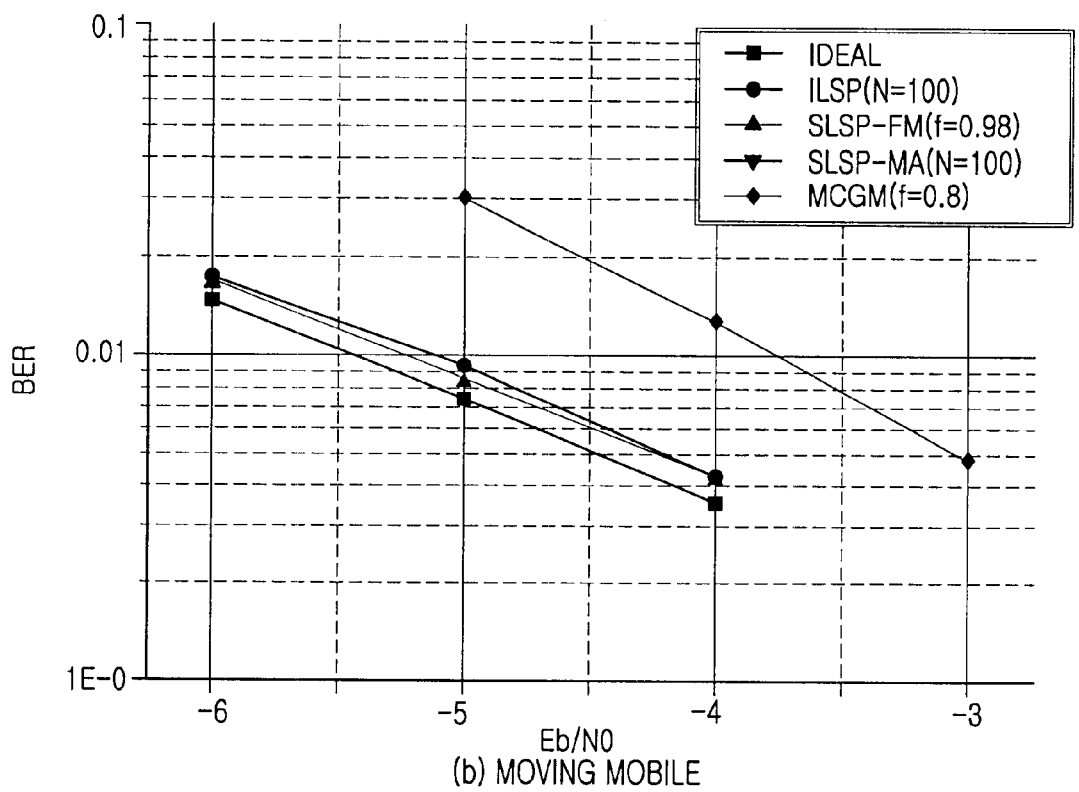

FIG. 13A is a graph showing simulated BER performance in the case of a stationary signal source and interfering signal and FIG. 13B is a graph showing simulated BER performance in the case of a moving signal source and interfering signal. These simulations were performed in an AWGN environment under the conditions of M=10, PSK modulation, and CDMA system throughput gain PG=63.

As described above, the adaptive beamforming algorithms of the present invention increase data processing speed and enable real time processing in application to smart antennas. Furthermore, a stable smart antenna having good performance can be implemented regardless of constant envelope characteristics, and computation requirement is not high, thus reducing memory capacity requirement.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A signal processing method in an adaptive array processing unit of an adaptive array smart antenna device, comprising the steps of:
   (a) receiving a predetermined number of signals from array antennas and constructing an input signal matrix with the received signals;
   (b) computing a transmission signal matrix that minimizes a cost function using a first steering matrix set to an initial value and the input signal matrix;
   (c) computing a second steering matrix that minimizes the cost function using the transmission signal matrix and the input signal matrix, mapping the second steering matrix on a unit circle, and constructing a third steering matrix with the mapped values;
   (d) normalizing the third steering matrix and determining whether the third steering matrix converges; and
   (e) demodulating data using the transmission signal matrix if the third steering matrix converges.

2. The signal processing method of claim 1, wherein the steps of (b) and (c) are repeated until the third steering matrix converges if the third steering matrix does not converge in the step of (d).

3. A signal processing method in an adaptive array processing unit of an adaptive array smart antenna device, comprising the steps of:
   (f) receiving a predetermined number of signals from array antennas and constructing an input signal matrix with the received signals;
   (g) computing a transmission signal matrix that minimizes a cost function using a first steering matrix set to an initial value and the input signal matrix;
   (h) computing a second steering matrix that minimizes the cost function using the transmission signal matrix and the input signal matrix, mapping the second steering matrix on a unit circle, and constructing a third steering matrix with the mapped values;
   (i) normalizing the third steering matrix and determining whether the third steering matrix converges; and
   (j) computing a weight factor from the third steering matrix if the third steering matrix converges, recomputing the transmission signal matrix using the weight vector, and demodulating data using the recomputed transmission signal matrix.

4. The signal processing method of claim 3, wherein the steps of (g) and (h) are repeated until the third steering matrix converges if the third steering matrix does not converge in the step of (i).

5. A signal processing method in an adaptive array processing unit of an adaptive array smart antenna device, comprising the steps of:
   (k) receiving a predetermined number of signals from array antennas and constructing an input signal matrix with the received signals;
   (l) computing a transmission signal matrix that minimizes a cost function using a first steering matrix set to an initial value and the input signal matrix, and mapping the transmission signal matrix on a unit circle;
   (m) computing a second steering matrix that minimizes the cost function using the mapped transmission signal matrix and the input signal matrix, mapping the second steering matrix on a unit circle, and constructing a third steering matrix with the mapped values;
   (n) normalizing the third steering matrix and determining whether the third steering matrix converges; and
   (o) demodulating data using the transmission signal matrix if the third steering matrix converges.

6. The signal processing method of claim 5, wherein the steps of (l) and (m) are repeated until the third steering matrix converges if the third steering matrix does not converge in the step of (n).

7. A signal processing method in an adaptive array processing unit of an adaptive array smart antenna device, comprising the steps of:
   (p) receiving a predetermined number of signals from array antennas and constructing an input signal matrix with the received signals;
   (q) computing a transmission signal matrix that minimizes a cost function using a first steering matrix set to an initial value and the input signal matrix, and mapping the transmission signal matrix on a unit circle;
   (r) computing a second steering matrix that minimizes the cost function using the mapped transmission signal matrix and the input signal matrix, mapping the second steering matrix on a unit circle, and constructing a third steering matrix with the mapped values;
   (s) normalizing the third steering matrix and determining whether the third steering matrix converges; and
   (t) computing a weight factor from the third steering matrix if the third steering matrix converges, recomputing the transmission signal matrix using the weight vector, and demodulating data using the recomputed transmission signal matrix.

8. The signal processing method of claim 7, wherein the steps of (q) and (r) are repeated until the third steering matrix converges if the third steering matrix does not converge in the step of (s).

9. A signal processing method in an adaptive array processing unit of an adaptive array smart antenna device, comprising the steps of:
   (u) setting a steering matrix, a transmission signal matrix, and an input signal matrix to predetermined initial values;
   (v) updating the input signal matrix upon receipt of a signal from array antennas by $$X = [X(1)X(2) \ldots X(n) \ldots X(N+i) = X_{in}] \qquad (26)$$

(w) computing a transmission signal matrix that minimizes a cost function using the updated input signal matrix and the steering matrix by equation $$\begin{aligned} S = S_k &= (A_k^{i-1})^H X \qquad (27) \\ &= [s_k(1) s_k(2) \ldots s_k(n) \ldots s_k(N+i)] \\ s_k(n) &= (A_k^{i-1})^H X(N+i) \\ &= \sum_{m=1}^{M} (a_k^{i-1}(m)) \cdot x_m(n), \text{ for only } n = N + i \end{aligned}$$

(x) computing a steering matrix that minimizes the cost function using the computed transmission signal matrix and the updated input signal matrix by $$A^i = A_k^i = X(S_k)^H \qquad (28)$$
$$= [a_k^i(1) a_k^i(2) \ldots a_k^i(m) \ldots a_k^i(M)]^T$$
$$a_k^i(m) = \sum_{n=1}^{N+1} (s_k(n)) \cdot x_m^i(n), \, m = 1, 2, \ldots, m, \ldots, M$$
$$= a_k^{i-1}(m) + (s_k(N+i) \cdot x_m(N+i), \text{ for}$$
$$m = 1, 2, \ldots, m, \ldots, M$$

and updating the computed steering matrix by normalization; and (y) demodulating the input data using the computed transmission signal matrix.

10. The signal processing method of claim 9, further comprising the step of mapping the elements of the computed transmission signal matrix to the nearest unit circle if the transmission signal has a constant envelope, after the step of (w).

11. The signal processing method of claim 9, wherein the computed steering matrix is normalized by mapping the computed steering matrix to the nearest unit circle in the step of (x).

12. A signal processing method in an adaptive array processing unit of an adaptive array smart antenna device, comprising the steps of:

(a') setting a steering matrix, a transmission signal matrix, and an input signal matrix to predetermined initial values;

(b') updating the input signal matrix upon receipt of a signal from array antennas by $$X=[X(1)X(2)\ldots X(n)\ldots X(N+i)=X_{in}] \qquad (29)$$

(c') computing a transmission signal matrix that minimizes a cost function using the updated input signal matrix and the steering matrix by equation $$S = S_k = (A_k^{i-1})^H X \qquad (30)$$
$$= [s_k(1) \; s_k(2) \; \cdots \; s_k(n) \; \cdots \; s_k(N+i)]$$
$$s_k(n) = (A_k^{i-1})^H X(N+i)$$
$$= \sum_{m=1}^{M} (a_k^{i-1}(m)) \cdot x_m(n), \text{ for only } n = N + i$$

(d') computing a steering matrix that minimizes the cost function using the computed transmission signal matrix and the updated input signal matrix by $$A^i = A_k^i = X(S_k)^H \qquad (31)$$
$$= [a_k^i(1) \; a_k^i(2) \; \cdots \; a_k^i(m) \; \cdots \; a_k^i(M)]^T$$
$$a_k^i(m) = \sum_{n=1}^{N+1} (s_k(n)) \cdot x_m^i(n), \quad m = 1, 2, \ldots, m, \ldots, M$$
$$= a_k^{i-1}(m) + (s_k(N+i) \cdot x_m(N+i),$$

for $m = 1, 2, \ldots, m, \ldots, M$ and updating the computed steering matrix by normalization; and (e') computing a weight factor using the updated steering matrix, recomputing a transmission signal matrix using the weight factor, and demodulating the input data using the recomputed transmission signal matrix.

13. The signal processing method of claim 12, further comprising the step of mapping the elements of the computed transmission signal matrix to the nearest unit circle if the transmission signal has a constant envelope, after the step of (c').

14. The signal processing method of claim 12, wherein the computed steering matrix is normalized by mapping the computed steering matrix to the nearest unit circle in the step of (d').

15. A signal processing method in an adaptive array processing unit of an adaptive array smart antenna device, comprising the steps of:

(f') setting a steering matrix, a transmission signal matrix, and an input signal matrix to predetermined initial values;

(g') updating the input signal matrix upon receipt of a signal from array antennas by $$X=[X(1)X(2)\ldots X(n)\ldots X(N+i)=X_{in}] \qquad (32)$$

(h') computing a transmission signal matrix that minimizes a cost function using the updated input signal matrix and the steering matrix by equation $$S = S_k = (A_k^{i-1})^H X \qquad (33)$$
$$= [s_k(1+i) \; s_k(2+i) \; \cdots \; s_k(n+i) \; \cdots \; s_k(N+i)]$$
$$s_k(n) = (A_k^{i-1})^H X(N+i)$$
$$= \sum_{m=1}^{M} (a_k^{i-1}(m)) \cdot x_m(n), \quad \text{for only } n = N + i$$

(i') computing a steering matrix that minimizes the cost function using the computed transmission signal matrix and the updated input signal matrix by $$A^i = A_k^i = X(S_k)^H \qquad (34)$$
$$= [a_k^i(1) \; a_k^i(2) \; \cdots \; a_k^i(m) \; \cdots \; a_k^i(M)]^T$$
$$a_k^i(m) = \sum_{n=1}^{N+1} (s_k(n)) \cdot x_m^i(n), \quad m = 1, 2, \ldots, m, \ldots, M$$
$$= a_k^{i-1}(m) - (s_k(i)) \cdot x_m(i) + (s_k(N+i)) \cdot x_m(N+i),$$

for $m = 1, 2, \ldots, m, \ldots, M$ and updating the computed steering matrix by normalization; and (j') demodulating the input data using the computed transmission signal matrix.

16. The signal processing method of claim 15, further comprising the step of mapping the elements of the computed transmission signal matrix to the nearest unit circle if the transmission signal has a constant envelope, after the step of (h').

17. The signal processing method of claim 15, wherein the computed steering matrix is normalized by mapping the computed steering matrix to the nearest unit circle in the step of (i').

18. A signal processing method in an adaptive array processing unit of an adaptive array smart antenna device, comprising the steps of:

(f') setting a steering matrix, a transmission signal matrix, and an input signal matrix to predetermined initial values;

(g') updating the input signal matrix upon receipt of a signal from array antennas by $$X=[X(1)X(2) \ldots X(n) \ldots X(N+i)=X_{in}] \quad (35)$$

(h') computing a transmission signal matrix that minimizes a cost function using the updated input signal matrix and the steering matrix by equation $$S = S_k = (A_k^{i-1})^H X \quad (36)$$
$$= [s_k(1+i) \; s_k(2+i) \; \cdots \; s_k(n+i) \; \cdots \; s_k(N+i)]$$
$$s_k(n) = (A_k^{i-1})^H X(N+i)$$
$$= \sum_{m=1}^{M} (a_k^{i-1}(m)) \cdot x_m(n), \quad \text{for only } n = N+i$$

(i') computing a steering matrix that minimizes the cost function using the computed transmission signal matrix and the updated input signal matrix by $$A^i = A_k^i = X(S_k)^H \quad (37)$$
$$= [a_k^i(1) \; a_k^i(2) \; \cdots \; a_k^i(m) \; \cdots \; a_k^i(M)]^T$$
$$a_k^i(m) = \sum_{n=1}^{N+1} (s_k(n)) \cdot x_m^i(n), \quad m = 1, 2, \ldots, m, \ldots, M$$
$$= a_k^{i-1}(m) - (s_k(i)) \cdot x_m(i) + (s_k(N+i)) \cdot x_m(N+i),$$

for $m = 1, 2, \ldots, m, \ldots, M$ and updating the computed steering matrix by normalization; and (j') computing a weight factor using the updated steering matrix, recomputing a transmission signal matrix using the weight factor, and demodulating the input data using the recomputed transmission signal matrix.

19. The signal processing method of claim 18, further comprising the step of mapping the elements of the computed transmission signal matrix to the nearest unit circle if the transmission signal has a constant envelope, after the step of (m').

20. The signal processing method of claim 18, wherein the computed steering matrix is normalized by mapping the computed steering matrix to the nearest unit circle in the step of (n').

21. A signal processing method in an adaptive array processing unit of an adaptive array smart antenna device, comprising the steps of:

(p') setting a steering matrix, a transmission signal matrix, and an input signal matrix to predetermined initial values;

(q') updating the input signal matrix upon receipt of a signal from array antennas by $$X=[X(1)X(2) \ldots X(n) \ldots X(N+i)=X_{in}] \quad (38)$$

(r') computing a transmission signal matrix that minimizes a cost function using the updated input signal matrix and the steering matrix by equation $$S = S_k = (A_k^{i-1})^H X \quad (39)$$
$$= [s_k(1+i) \; s_k(2+i) \; \cdots \; s_k(n+i) \; \cdots \; s_k(N+i)]$$
$$s_k(n) = (A_k^{i-1})^H X(N+i)$$
$$= \sum_{m=1}^{M} (a_k^{i-1}(m)) \cdot x_m(n), \quad \text{for only } n = N+i$$

(s') computing a steering matrix that minimizes the cost function using the computed transmission signal matrix and the updated input signal matrix by $$A^i = A_k^i = X(S_k)^H \quad (40)$$
$$= [a_k^i(1) \; a_k^i(2) \; \cdots \; a_k^i(m) \; \cdots \; a_k^i(M)]^T$$
$$a_k^i(m) = \sum_{n=i+1}^{N+1} (s_k(n)) \cdot x_m^i(n), \quad m = 1, 2, \ldots, m, \ldots, M$$
$$= fa_k^{i-1}(m) - (s_k(N+i)) \cdot x_m(N+i),$$
$$m = 1, 2, \ldots, m, \ldots, M$$
$$\sum_{n=i+1}^{N+1} f^{N+i-k}(s_k(n)) \cdot x_m^i(n),$$
$$m = 1, 2, \ldots, m, \ldots, M$$

and updating the computed steering matrix by normalization; and (t') demodulating the input data using the computed transmission signal matrix.

22. The signal processing method of claim 21, further comprising the step of mapping the elements of the computed transmission signal matrix to the nearest unit circle if the transmission signal has a constant envelope, after the step of (r').

23. The signal processing method of claim 21, wherein the computed steering matrix is normalized by mapping the computed steering matrix to the nearest unit circle in the step of (s').

24. A signal processing method in an adaptive array processing unit of an adaptive array smart antenna device, comprising the steps of:

(u') setting a steering matrix, a transmission signal matrix, and an input signal matrix to predetermined initial values;

(v') updating the input signal matrix upon receipt of a signal from array antennas by $$X=[X(1)X(2) \ldots X(n) \ldots X(N+i)=X_{in}] \quad (41)$$

(w') computing a transmission signal matrix that minimizes a cost function using the updated input signal matrix and the steering matrix by equation $$S = S_k = (A_k^{i-1})^H X \quad (42)$$
$$= [s_k(1+i) \; s_k(2+i) \; \cdots \; s_k(n+i) \; \cdots \; s_k(N+i)]$$
$$s_k(n) = (A_k^{i-1})^H X(N+i)$$
$$= \sum_{m=1}^{M} (a_k^{i-1}(m)) \cdot x_m(n), \quad \text{for only } n = N+i$$

(x') computing a steering matrix that minimizes the cost function using the computed transmission signal matrix and the updated input signal matrix by $$A^i = A_k^i = X(S_k)^H \qquad (43)$$

$$= [\, a_k^i(1) \quad a_k^i(2) \quad \cdots \quad a_k^i(m) \quad \cdots \quad a_k^i(M) \,]^T$$

$$a_k^i(m) = \sum_{n=i+1}^{N+1} (s_k(n)) \cdot x_m^i(n), \quad m = 1, 2, \ldots, m, \ldots, M$$

$$= f a_k^{i-1}(m) - (s_k(N+i)) \cdot x_m(N+i),$$

$$m = 1, 2, \ldots, m, \ldots, M$$

$$\sum_{n=i+1}^{N+1} f^{N+i-k}(s_k(n)) \cdot x_m^i(n),$$

$$m = 1, 2, \ldots, m, \ldots, M$$

and updating the computed steering matrix by normalization; and (y') computing a weight factor using the updated steering matrix, recomputing a transmission signal matrix using the weight factor, and demodulating the input data using the recomputed transmission signal matrix.

25. The signal processing method of claim 24, further comprising the step of mapping the elements of the computed transmission signal matrix to the nearest unit circle if the transmission signal has a constant envelope, after the step of (w').

26. The signal processing method of claim 24, wherein the computed steering matrix is normalized by mapping the computed steering matrix to the nearest unit circle in the step of (x').

27. The signal processing method of claim 10, wherein the computed steering matrix is normalized by mapping the computed steering matrix to the nearest unit circle in the step of (x).

28. The signal processing method of claim 13, wherein the computed steering matrix is normalized by mapping the computed steering matrix to the nearest unit circle in the step of (d').

29. The signal processing method of claim 16, wherein the computed steering matrix is normalized by mapping the computed steering matrix to the nearest unit circle in the step of (i').

30. The signal processing method of claim 19, wherein the computed steering matrix is normalized by mapping the computed steering matrix to the nearest unit circle in the step of (n').

31. The signal processing method of claim 22, wherein the computed steering matrix is normalized by mapping the computed steering matrix to the nearest unit circle in the step of (s').

32. The signal processing method of claim 24, wherein the computed steering matrix is normalized by mapping the computed steering matrix to the nearest unit circle in the step of (x').

\* \* \* \* \*